United States Patent
Xu

(10) Patent No.: US 10,706,611 B2
(45) Date of Patent: Jul. 7, 2020

(54) THREE-DIMENSIONAL REPRESENTATION BY MULTI-SCALE VOXEL HASHING

(71) Applicants: Beijing Jingdong Shangke Information Technology Co., Ltd., Beijing (CN); JD.com American Technologies Corporation, Mountain View, CA (US)

(72) Inventor: Yi Xu, Menlo Park, CA (US)

(73) Assignees: Beijing Jingdong Shangke Information Technology Co., Ltd., Beijing (CN); JD.com American Technologies Corporation, Mountain View, CA (US)

( * ) Notice: Subject to any disclaimer, the term of this patent is extended or adjusted under 35 U.S.C. 154(b) by 77 days.

(21) Appl. No.: 16/009,356

(22) Filed: Jun. 15, 2018

(65) Prior Publication Data
US 2019/0385355 A1    Dec. 19, 2019

(51) Int. Cl.
| G06T 15/08 | (2011.01) |
| G06T 17/00 | (2006.01) |
| G06F 16/00 | (2019.01) |
| G06T 19/00 | (2011.01) |
| G06F 16/22 | (2019.01) |

(52) U.S. Cl.
CPC .......... *G06T 15/08* (2013.01); *G06F 16/2255* (2019.01); *G06T 17/00* (2013.01); *G06T 19/006* (2013.01); *G06T 2210/12* (2013.01); *G06T 2210/21* (2013.01)

(58) Field of Classification Search
None
See application file for complete search history.

(56) References Cited

PUBLICATIONS

Nießner, Matthias, et al. "Real-time 3D reconstruction at scale using voxel hashing." ACM Transactions on Graphics (ToG) 32.6 (2013): 169; (Year: 2013).*
Apple Inc., ARKit, https://developer.apple.com/arkit/.
GOOGLE LLC, ARCore, https://developers.google.com/ar/.
Brian Curless and Marc Levoy, A Volumetric Method for Building Complex Models from Range Images, Proceeding SIGGRAPH '96 (Proceedings of the 23rd annual conference on Computer graphics and interactive techniques), 1996, pp. 303-312.

(Continued)

*Primary Examiner* — Nurun N Flora
(74) *Attorney, Agent, or Firm* — China Science Patent & Trademark US LLC; Shanyun Lu

(57) ABSTRACT

A system and method for constructing a multi-scale voxel representation of a three-dimensional (3D) sparse point map. The method includes: providing the 3D sparse point map; receiving coordinates of a 3D point from the 3D sparse point map; converting the coordinates of the 3D point to integer coordinates; and when the integer coordinates are not encompassed by any voxel entries of a hash table: creating a new unit voxel at scale level 0, scale level 0 being a minimum voxel size; calculating a hash value using the integer coordinates; inserting the new unit voxel into the hash table; and merging the new unit voxel with neighboring voxels along at least one axis of the integer coordinates, so as to obtain the multi-scale voxel representation of the 3D sparse point map.

20 Claims, 17 Drawing Sheets

(56) References Cited

PUBLICATIONS

R. A. Newcombe et al., KinectFusion: Real-time dense surface mapping and tracking, 10th IEEE International Symposium on Mixed and Augmented Reality, 2011, pp. 127-136.

Matthias Nießner, Michael Zollhöfer, Shahram Izadi, and Marc Stamminger, Real-time 3D reconstruction at scale using voxel hashing, ACM Trans. Graph. 2013, vol. 32, Issue 6, Article No. 169.

* cited by examiner

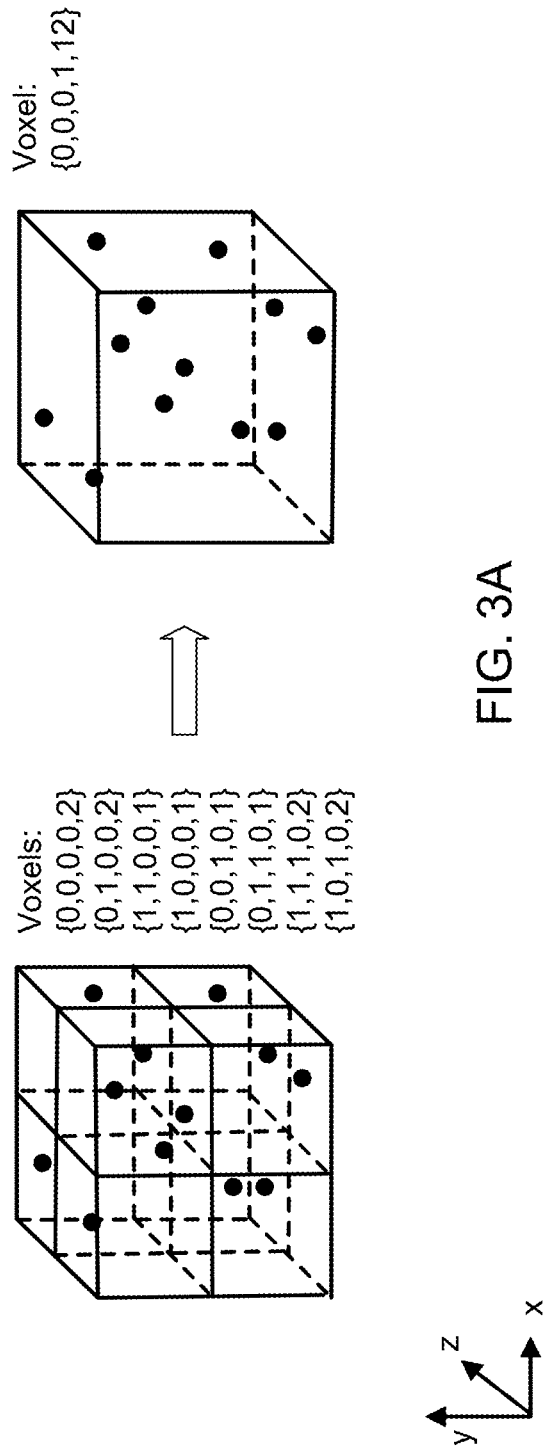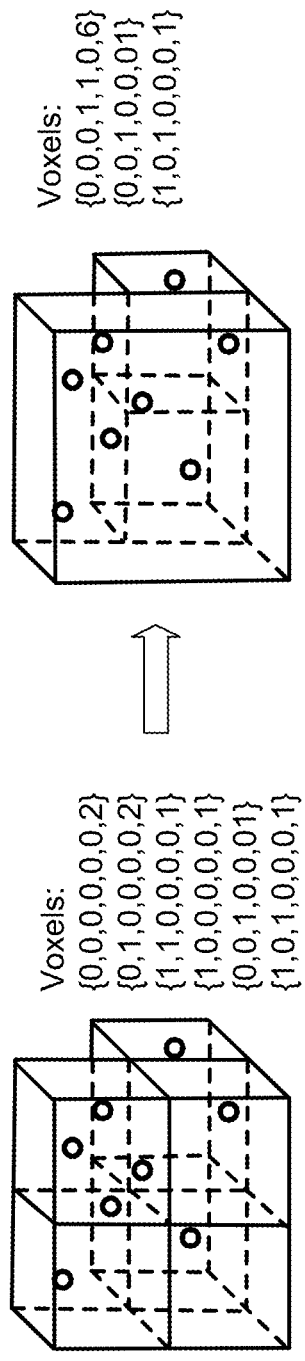
FIG. 3A
FIG. 3B

| Scene | Kitchen | Storage Room | Table | Conference Room |
|---|---|---|---|---|
| Capture time (sec) | 22.8 | 64.9 | 62.6 | 36.3 |
| Number of 3D points | 276,137 | 594,096 | 465,637 | 40,796 |
| Number of Voxels | 4,026 | 7,808 | 853 | 387 |
| Min. Voxel Size (cm) | 4 | 4 | 4 | 8 |
| Compression Ratio | 82.3 | 91.3 | 655.1 | 126.5 |
| Memory (kB) | 39.3 | 76.25 | 8.33 | 3.78 |

FIG. 9A

| Run Times | 30s | 60s | 120s | 240s |
|---|---|---|---|---|
| 3D points | 107,730 | 172,649 | 315,339 | 544,110 |
| Voxels | 2,215 | 2,885 | 3,749 | 4,542 |

FIG. 9B

| Scene | Kitchen | Storage Room | Table | Conference Room |
|---|---|---|---|---|
| Single Scale | 6,278 | 13,569 | 1,251 | 631 |
| Multi-Scale | 4,026 | 7,808 | 853 | 387 |
| Reduction | 35.9% | 42.5% | 31.8% | 38.7% |

FIG. 9C

THREE-DIMENSIONAL REPRESENTATION BY MULTI-SCALE VOXEL HASHING

CROSS-REFERENCES

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD

The present disclosure relates generally to three-dimensional (3D) reconstruction, and more particularly to system and methods for efficient three-dimensional representation using multi-scale voxel hashing for mobile augmented reality (AR).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Augmented reality (AR) is a direct or indirect live view of a physical, real-world environment whose elements are "augmented" by computer-generated perceptual information, ideally across multiple sensory modalities, including visual, auditory, haptic, somatosensory, and olfactory. Mobile AR technologies use a mobile phone's camera and its display to provide live view of the surrounding physical environment, which is then "augmented" by computer-generated elements (e.g., digital objects). A key component of mobile AR is monocular Simultaneous Localization and Mapping (SLAM), which constructs and updates a map of an unknown environment while simultaneously keeping track of the camera pose.

Without additional knowledge of the scene geometry, monocular SLAM approach usually relies on structure-from-motion (SfM) to bootstrap camera tracking. SfM methods reconstruct an initial structure of the scene and recover camera pose at the same time. However, these reconstructions are up to an arbitrary scale. With the recent advancement of sensor fusion technology, Visual-Inertial Odometry (VIO) becomes mature enough for commercial use. Two most prominent examples are Apple's ARKit and Google's ARCore platforms. By fusing visual and inertial sensor information, metric scale of the environment can also be estimated. With accurate camera tracking and scale estimation, ARKit and ARCore allow seamless blending of digital objects and information with the physical environment. There are already a lot of mobile applications, such as e-commerce, gaming, education, etc., that leverage such capability. However, one important issue that has not been addressed by these systems is collision detection and avoidance.

Therefore, an unaddressed need exists in the art to address the aforementioned deficiencies and inadequacies.

SUMMARY

In certain aspects, the present disclosure relates to a method for constructing a multi-scale voxel representation of a three-dimensional (3D) point map using a computing device. In certain embodiments, the method includes: providing the 3D point map in a coordinate space, the coordinate space having x, y and z axes; receiving coordinates of a 3D point from the 3D point map; converting the coordinates of the 3D point to integer coordinates; comparing the integer coordinates with voxel entries in a hash table; and in determining the integer coordinates are not encompassed by any of the voxel entries in the hash table: creating a new unit voxel at scale level 0, each of three dimensions of the new unit voxel having a size of a unit length respectively corresponding to one integer unit of the integer coordinates along the axes of the coordinate space; calculating a hash value using the integer coordinates; inserting the new unit voxel into the hash table; and attempting merging the new unit voxel with neighboring voxels along at least one axis of coordinate space, so as to obtain the multi-scale voxel representation of the 3D point map.

In certain embodiments, the step of merging includes: determining three neighboring level m (i.e., scale level m) voxels, where a longest dimension of the level m voxel has a length of $2^m$ units, the three neighboring level m voxels are located at a same plane as a new level m voxel, the three neighboring level m voxels and the new level m voxel belong to a same uniform level m+1 voxel, a longest dimension of each of the level m voxel and the new level m voxel has a length of $2^m$ units, and all three dimensions of the uniform level m+1 voxel has a length of $2^{m+1}$ units; and when the three neighboring level m voxels are available in the hash table: combining the new level m voxel and the three neighboring level m voxels to form a new level m+1 voxel, a longest dimension of the new level m+1 voxel having a length of $2^{m+1}$ units; adding the new level m+1 voxel to the hash table; and deleting the three neighboring level m voxels and the new level m voxel from the hash table. In certain embodiments, m is an integer in a range of 0-9, and a density of the new level m+1 voxel is a sum of densities of the new level m voxel and the three neighboring level m voxels. In certain embodiments, the density is the number of points in the volume of a voxel.

In certain embodiments, integer coordinates of the 3D point are $(x_i, y_i, z_i)$, integer coordinates of a vertex of the uniform level m+1 voxel that is closest to origin of the coordinate space are $(x_i/2^{(m+1)} * 2^{(m+1)}, y_i/2^{(m+1)} * 2^{(m+1)}, z_i/2^{(m+1)} * 2^{(m+1)})$, and each of $x_i/2^{(m+1)}, y_i/2^{(m+1)}, z_i/2^{(m+1)}$ is an integer division.

In certain embodiments, the step of merging is attempted sequentially along xy-plane, yz-plane, and xz-plane, and x, y, z respectively correspond to three axes of a Cartesian coordinate system of the 3D point map. In certain embodiments, when the three neighboring level m voxels along one of the planes are not available in the hash table, the merging step is further attempted along other planes. When merging is executed at one voxel level, the method further attempts merging on the next voxel level. When no merging is possible at a certain voxel level, the method receives or retrieves another new 3D point from the 3D point map to perform the above steps again.

In certain embodiments, the vertices of a uniform level m voxel can be defined using integer division and multiplication. For example, from the origin (0, 0, 0) of the voxel integer coordinates, uniform level 0 voxels have a length of 1, 1, 1 ($2^0$) unit along x, y, and z axis, such as the cube having the (0, 0, 0) as the closest vertex to origin and (1, 1, 1) as the farthest vertex to origin; or the cube having (1, 1, 1) as the closest vertex to origin and (2, 2, 2) as farthest vertex to the origin, and the 3D space of the scene is filled with those level 0 voxels; the uniform level 1 voxels have a length of 2, 2, 2 units along x, y, and z axis, such as the cube having the (0, 0, 0) as the closest vertex to origin and (2, 2, 2) as the farthest vertex to origin; or the cube having (2, 2, 2) as the closest vertex to origin and (4, 4, 4) as the farthest vertex to origin; and each of the uniform level 1 voxel occupies the same space as eight uniform level 0 voxels; the uniform level m voxels have a length of $2^m$, $2^m$, $2^m$ along x, y, and z axis, such as the cube having (0, 0, 0) as the closest vertex to origin and ($2^m$, $2^m$, $2^m$) as the farthest vertex to origin or the cube having vertices ($2^m$, $2^m$, $2^m$) as the closest vertex to origin and ($2^m$, $2^{m+1}$, $2^{m+1}$) as the farthest vertex to origin, and each of the uniform level m voxel occupies the same space as eight uniform level m−1 voxels. In other words, the different levels of voxels are determined by calculating from origin of the coordinate space, and extending in three dimensions from the origin in the unit of $2^0$, $2^1$, $2^2$, ... $2^m$ respectively to define locations of level 0, 1, 2, ... m voxels. In certain embodiments, the longest dimension of a level m voxel has a length of $2^m$. In other words, one, two or three dimensions of the level m voxel have a length of $2^m$ units, while none, the other one, or the other two dimensions of the level m voxel have a length of less than $2^m$ units such as $2^{m-1}$, $2^{m-2}$, or $2^0$ units. When all the three dimensions of the level m voxel have a uniform length of $2^m$ units, the voxel may be named a uniform level m voxel.

In certain embodiments, the 3D point map is a 3D sparse point map.

In certain embodiments, the coordinates of the 3D point are converted to the integer coordinates by multiplying the coordinates with a scaling integer. In certain embodiments, the scaling integer is in a range of 10-1000. In certain embodiments, the scaling integer is in a range of 50-200. In one embodiment, the scaling integer is 100.

In certain embodiments, integer coordinates of the 3D point are ($x_i$, $y_i$, $z_i$), and the step of comparing the integer coordinates with voxel entries in a hash table includes: calculating a hash value of the level m voxel based on the coordinates ($x_i/2^m*2^m$, $y_i/2^m*2^m$, $z_i/2^m*2^m$); and comparing the integer coordinates ($x_i$, $y_i$, $z_i$) with coordinates of uniform level m voxel entries indexed by the hash value. When the integer coordinates ($x_i$, $y_i$, $z_i$) are encompassed by any of the uniform level m voxel entries indexed by the hash value, it is determined that the integer coordinates ($x_i$, $y_i$, $z_i$) are contained in the voxel entry in the hash table. The embodiments here relates to uniform voxel searching, that is, the voxels have the same level along three axes.

In certain embodiments, non-uniform searching is performed. In those embodiments, integer coordinates of the 3D point are ($x_i$, $y_i$, $z_i$), and the step of comparing the integer coordinates with voxel entries in a hash table includes: calculating a hash value of the level m voxel based on the coordinates ($x_i$, $y_i$, $z_i$) and level scales $l_x$, $l_y$, and $l_z$; and comparing the integer coordinates ($x_i$, $y_i$, $z_i$) with coordinates of corresponding level m voxel entries (if available) indexed by the hash value. When the integer coordinates ($x_i$, $y_i$, $z_i$) are encompassed by any of the level m voxel entries indexed by the hash value and having the corresponding scale level along three axes, it is determined that the integer coordinates ($x_i$, $y_i$, $z_i$) are contained in the voxel entry in the hash table. Specifically, the set of potential level m voxels that encompass a 3D point ($x_i$, $y_i$, $z_i$) are represented by ($x_i/2^h*2^h$, $y_i/2^k*2^k$, $z_i/2^l*2^l$, h, k, l), where h, k and l are positive integers ranging from 0 to m. Because the voxel is a level m voxel, at least one of h, k and l equals to m, and the other two equal to or are less than m. When h, k and l are equal, the representation is the same as uniform searching. For each of the voxel ($x_i/2^h*2^h$, $y_i/2^k*2^k$, $z_i/2^l*2^l$, h, k, l), a hash value is calculated, and a search is performed to determine whether the voxel ($x_i/2^h*2^h$, $y_i/2^k*2^k$, $z_i/2^l*2^l$, h, k, l) is indexed by the calculated hash value in the hash table. In certain embodiments, the step of searching starts by fixing h=m, and runs k and l from 0 to m, which corresponds to searching of m*m voxels; then fixing k=m, and runs h from 0 to (m−1) and l from 0 to m, which corresponds to searching of (m−1)*m voxels; at last fixing l=m, and runs h from 0 to (m−1) and k from 0 to (m−1), which corresponds to searching of (m−1)*(m−1) voxels. The above process may be varied. In certain embodiments, all the above three calculations for h, k and l are from 0 to m, and the repetitive calculation of certain voxels such as h=m, k=m and l=m does not waste the calculation resource much. In certain embodiments, the step of searching performs uniform searching and then performs non-uniform searching. In certain embodiments, only non-uniform searching is performed, which includes the conditions of uniform searching when h, k, and l are the same.

In summary, the searching may be performed from each of h, k, l equals to 0; then each of h, k, l<=1 and at least one of h, k, l equals to 1; then each of h, k, l<=2 and at least one of h, k, l equals to 2; ... ; and then each of h, k, l<=m and at least one of h, k, l equals to m, until the a voxel ($x_i/2^h*2^h$, $y_i/2^k*2^k$, $z_i/2^l*2^l$, h, k, l) is found to be stored in the hash table or until a threshold level m is reached and there is no voxel entry encompassing the integer coordinates ($x_i$, $y_i$, $z_i$).

In certain embodiments, the hash value is calculated using a formula of: H ($x_i$, $y_i$, $z_i$)=($x_i*p_1 \oplus y_i*p_2 \oplus z_i*p_3$) mod n, where ($x_i$, $y_i$, $z_i$) are integer coordinates of the 3D point, $p_1$, $p_2$, and $p_3$ are large prime numbers, $\oplus$ is exclusive or operation, and n is a number of slots in the hash table.

In certain embodiments, each of the voxel entries in the hash table is in a form of {$x_1$, $y_i$, $z_i$, $l_x$, $l_y$, $l_z$, d}, where $x_i$, $y_i$, $z_i$ are integer coordinates of the vertex of the voxel that is closest to the origin, $l_x$, $l_y$, and $l_z$ are voxel scale levels along the x, y and z direction, and d is density of the voxel entry.

In certain embodiments, the method further includes aligning the 3D point map with real world coordinates of a scene. For example, they axis is aligned with the vertical direction using the inertia information, the x or z direction is aligned with a wall of a room by detecting the wall surface first.

In certain embodiments, the method further includes detecting and avoiding collision of a 3D model and the 3D point map by: converting the 3D model to a 3D representation; and determining whether the 3D representation of the 3D model overlaps with the multi-scale voxel representation of the 3D point map. In certain embodiments, the 3D representation of the 3D model includes voxel representation, bounding box representation, and bounding sphere representation. As to the bounding box representation, the 3D model may be represented by one bounding box or a set of bounding boxes.

In certain embodiments, when the integer coordinates of the point currently being processed are already encompassed by any of the voxel entries of the hash table: adding density of the one voxel entry by 1. Here the density represents the number of 3D points contained in the corresponding voxel. However, the density is not limited to the number of 3D points, but can be other properties of the 3D points.

In certain aspects, the present disclosure relates to a system for constructing a multi-scale voxel representation of a three-dimensional (3D) point map. In certain embodiments, the system includes a computing device. The computing device has a processor and a storage device storing computer executable code. The computer executable code, when executed at the processor, is configured to: provide the 3D point map in a coordinate space, the coordinate space having x, y and z axes; receive coordinates of a 3D point from the 3D point map; convert the coordinates of the 3D point to integer coordinates; compare the integer coordinates with voxel entries in a hash table; and in determining the integer coordinates or 3D point is encompassed by any of the voxel entries in the hash table: create a new unit voxel at scale level 0, each of three dimensions of the new unit voxel having a size of a unit length respectively corresponding to one integer unit of the integer coordinates along the axes of the coordinate space; calculate a hash value using the integer coordinates; insert the new unit voxel into the hash table; and attempt merging the new unit voxel with neighboring voxels along at least one axis of the coordinate space, so as to obtain the multi-scale voxel representation of the 3D point map. Here the coordinate space indicates the coordinate space of the 3D point map or the 3D voxel representation, where the 3D point map and the 3D voxel representation share the same 3D space.

In certain embodiments, the computer executable code is configured to merge the new voxel by: determining three neighboring level m voxels, where the three neighboring level m voxels are located at a same plane as a new level m voxel, the three neighboring level m voxels and the new level m voxel belong to a same uniform level m+1 voxel, a longest dimension of each of the level m voxel and the new level m voxel has a length of $2^m$ units, and all three dimensions of the uniform level m+1 voxel has a length of $2^{m+1}$ units; and when the three neighboring level m voxels are available in the hash table: combining the new level m voxel and the three neighboring level m voxels to form a new level m+1 voxel, a longest dimension of the new level m+1 voxel has a length of $2^{m+1}$ units; adding the new level m+1 voxel to the hash table; and deleting the three neighboring level m voxels and the new level m voxel from the hash table, where m is an integer in a range of 0-9, and a density of the new level m+1 voxel is a sum of densities of the new level m voxel and the three neighboring level m voxels.

In certain embodiments, the computer executable code is configured to attempt merging voxels sequentially on xy-plane defined by the x and y axes, yz-plane defined by the y and z axes, and xz-plane defined by the x and z axes.

In certain embodiments, the 3D point map is a 3D sparse point map, the computer executable code is configured to convert the coordinates of the 3D point to the integer coordinates by multiplying the coordinates with a scaling integer, and the scaling integer is in a range of 10-1000.

In certain embodiments, the computer executable code is configured to calculate the hash value using a formula of: $H(x_i, y_i, z_i)=(x_i*p_1 \oplus y_i*p_2 \oplus z_i*p_3) \bmod n$, where $(x_1, y_1, z_1)$ are integer coordinates of the 3D point, $p_1$, $p_2$, and $p_3$ are large prime numbers, $\oplus$ is exclusive or operation, and n is a number of slots in the hash table.

In certain embodiments, each of the voxel entries in the hash table is in a form of $\{x_i, y_i, z_i, l_x, l_y, l_z, d\}$, where $x_i, y_i, z_i$ are integer coordinates of the vertex that is closest to the origin, $l_x$, $l_y$, and $l_z$ are voxel scale levels along the x, y and z direction, and d is density of the voxel.

In certain embodiments, the computer executable code is further configured to detect and avoid collision of a 3D model and the 3D point map by: converting the 3D model to a 3D representation; determining whether the 3D representation of the 3D model overlaps with the multi-scale voxel representation of the 3D point map. In certain embodiments, the 3D representation of the 3D model includes voxel representation, bounding box representation, and bounding sphere representation. As to the bounding box representation, the 3D model may be represented by one bounding box or a set of bounding boxes.

In certain aspects, the present disclosure relates to a non-transitory computer readable medium storing computer executable code. The computer executable code, when executed at a processor of a computing device, is configured to perform the method as described above.

These and other aspects of the present disclosure will become apparent from following description of the preferred embodiment taken in conjunction with the following drawings and their captions, although variations and modifications therein may be affected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment.

FIG. 3A schematically depicts a uniform multi-scale voxel merging process according to certain embodiments of the present disclosure.

FIG. 3B schematically depicts a multi-scale voxel merging process with non-uniform scales along the three axes of the coordinate space according to certain embodiments of the present disclosure.

FIG. 9A schematically depicts multi-scale voxel representation statistics according to certain embodiments of the disclosure.

FIG. 9B schematically depicts variation of multi-scale voxel representation and variation of 3D points relative to run time.

FIG. 9C schematically depicts reduction rate of multi-scale voxel representation comparing to single-scale voxel representation.

DETAILED DESCRIPTION

Figure 1:
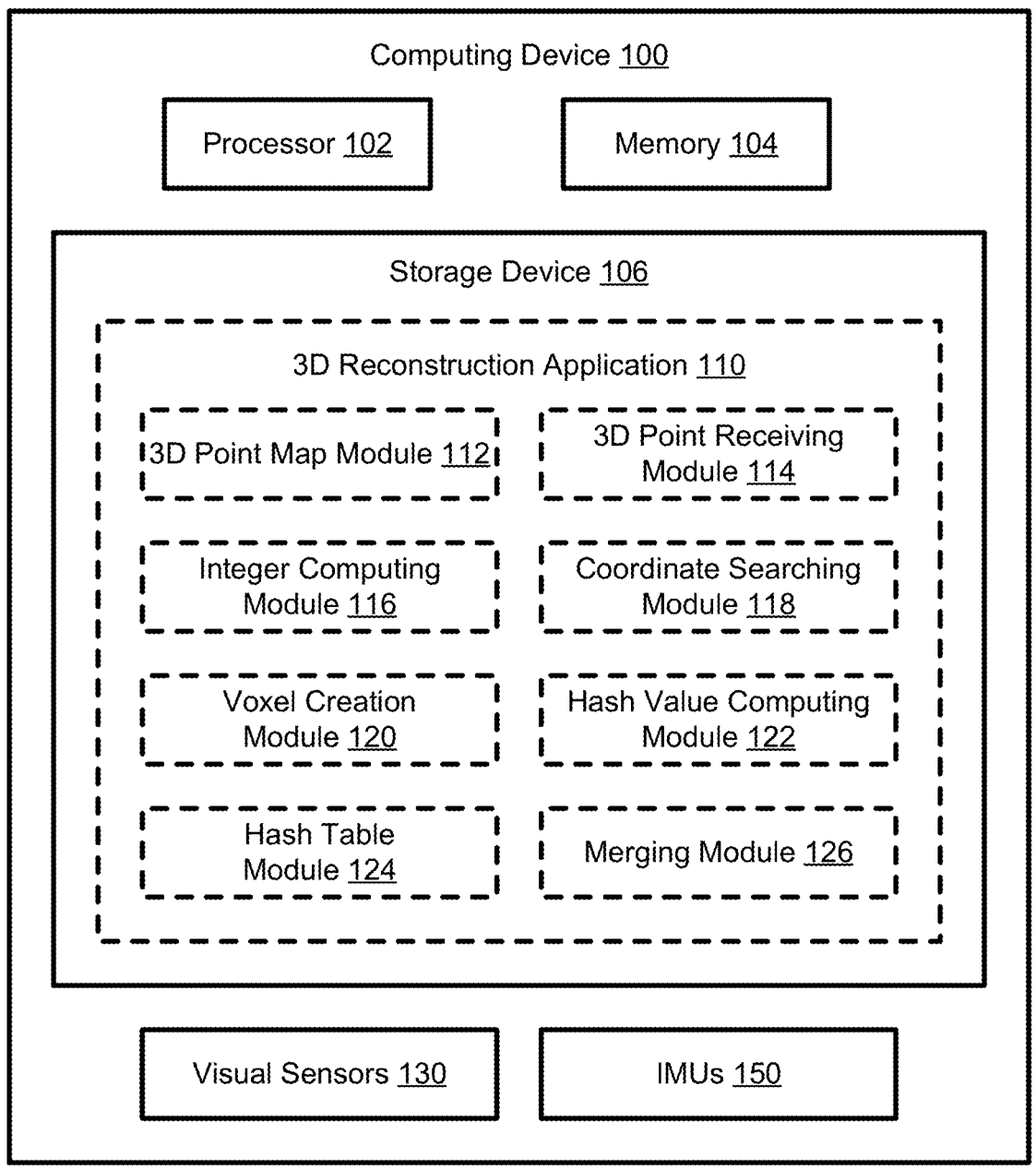
FIG. 1 schematically depicts a computing device according to certain embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompass both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about", "substantially" or "approximately" shall generally mean within 20 percent, preferably within 10 percent, and more preferably within 5 percent of a given value or range. Numerical quantities given herein are approximate, meaning that the term "around", "about", "substantially" or "approximately" can be inferred if not expressly stated.

As used herein, "plurality" means two or more.

As used herein, the terms "comprising", "including", "carrying", "having", "containing", "involving", and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The term "interface", as used herein, generally refers to a communication tool or means at a point of interaction between components for performing data communication between the components. Generally, an interface may be applicable at the level of both hardware and software, and may be uni-directional or bi-directional interface. Examples of physical hardware interface may include electrical connectors, buses, ports, cables, terminals, and other I/O devices or components. The components in communication with the interface may be, for example, multiple components or peripheral devices of a computer system.

Overview of the Disclosure

As described above, collision detection and avoidance are not addressed in the mobile AR systems. Typically, once digital objects are placed in the physical environment, they can be moved around freely. This can cause the digital objects and real objects occupy the same physical space, leading to unrealistic perception.

To solve this problem in an efficient way on mobile devices, in certain aspects, the present disclosure provides a multi-scale voxel hashing algorithm. The method takes the 3D points generated by a monocular SLAM system as input and uses a hash table to store the data into voxels. Nearby points might be represented by a common voxel. In addition, a bottom-up merging of voxels is provided in order to reduce total memory footprint. Moreover, since the voxel hashing scheme implicitly removes redundant 3D points, point correspondence between frames is not required to identify repeating points. This allows the method according to certain embodiments of the present disclosure to work with ARKit and ARCore, where such correspondence data is propriety and not accessible to developers.

In certain aspects, an approach is provided which is capable of processing the 3D sparse point cloud captured by SLAM systems. In certain embodiments, the approach also enables collision detection and avoidance, which has a significant impact on the realism of an AR application. In addition, the method can also work with other types of range scanners if the pose of the scanning device can be tracked in real time either using an external device or using a range-based SLAM algorithm. 3D reconstruction approaches can create fine models and the created fine models can be eventually used for collision detection and avoidance. However, a detailed 3D reconstruction is not only computationally expensive but also unnecessary. Therefore, in certain embodiments, the present disclosure represents the 3D environment using a set of multi-scale voxels for mobile AR applications. These embodiments, among other things, have the following advantages:

1. An efficient 3D representation using sparse point sets generated by VIO systems.

2. A multi-scale bottom-up merging scheme that effectively merges voxels together and reduces memory footprint.

3. An easy-to-implement collision detection and avoidance approach for mobile AR applications.

In one aspect of the disclosure, a method is provided to extend the voxel hashing scheme and apply that to the sparse point cloud data generated by a VIO system. The method allows for easy and fast collision detection and avoidance between digital objects and physical objects in AR applications.

For sparse point data, using a regular grid for storage is not effective because most of the voxels will be marked as empty. A hierarchical tree-like data structure will alleviate this problem, but it is still computationally expensive. Moreover, creating a surface from sparse volumetric data using a common surface reconstruction algorithm such as isosurfacing is impractical. In certain embodiments, the method uses a spatial voxel hashing scheme: a hash value is computed for each point using its integer coordinates and voxel data is then stored in a hash table. With such a hashing mechanism, the number of voxels still increases with the number of input 3D points. When an area of the scene contains rich textures, there will be many entries in the hash table. This limits the capability of performing certain tasks such as collision avoidance. Each small voxel has to be tested against the digital object to detect collision. To solve this problem, in certain embodiments, a multi-scale bottom-up merging procedure is provided, which can effectively merge voxels together to reduce memory footprint.

In certain embodiments, the method includes voxel hashing. For each point, the step of voxel hashing maps the integer coordinates $(x_i, y_i, z_i)$ of the 3D point to a hash value using the following formula (1):

$$H(x_i, y_i, z_i) = (x_i * p_1 \oplus y_i * p_2 \oplus z_i * p_3) \mod n,$$

where $p_1$, $p_2$, and $p_3$ are large prime numbers and n is the number of slots in the hash table. The integer coordinates $(x_i, y_i, z_i)$ is derived from the 3D coordinates $(x_r, y_r, z_r)$ in the 3D map by keeping only the integer components of the 3D coordinates $(x_r, y_r, z_r)$. In certain embodiments, further revision of the 3D coordinates $(x_r, y_r, z_r)$ is performed before deriving the integer coordinates $(x_i, y_i, z_i)$. Specifically, if the 3D coordinates of the 3D point $(x_r, y_r, z_r)$ contain negative numbers, the negative coordinates $(x_r, y_r, z_r)$ are transformed to positive coordinates before deriving the integer coordinates $(x_i, y_i, z_i)$. The transform may be performed by adding a positive offset I to each dimension of $(x_r, y_r, z_r)$ to obtain $(x_r+I, y_r+I, z_r+I)$, and then $x_i, y_i, z_i$ are respectively integer components of $x_r+I, y_r+I, z_r+I$. The positive number I for example may be 10 to ensure all negative coordinates can be changed to be positive. Further, if the integer components of the 3D coordinates $(x_r, y_r, z_r)$ of the 3D point have limited number of digits, in certain embodiments, the coordinates $(x_r, y_r, z_r)$ are multiplied by a scaling integer S before hashing. For example, in ARKit, coordinates are specified in meters. Therefore, measurements have 0 or 1 digit of integer component. In certain embodiments, S=100 is used to scale the world coordinates $(x_r, y_r, z_r)$ of 3D points to obtain $(x_r*100, y_r*100, z_r*100)$, and then $x_i, y_i, z_i$ are respectively integer components of $x_r*100, y_r*100, z_r*100$. When S=100, after removing the decimal parts to obtain the integer coordinates $(x_i, y_i, z_i)$, points with the same integer coordinates are represented implicitly by a unit voxel, whose size is 1 cm$^3$. In certain embodiments, when both changing from negative to positive and integer scaling are needed, the coordinates $(x_r, y_r, z_r)$ may derive integer coordinates $((x_r+I)*100, (y_r+I)*100, (z_r+I)*100)$. In certain embodiments, coordinates from digital model are transformed using offset I and scaling factor S before collision computation, so that the virtual object and the voxel representation share the same coordinate space. When multiple voxels map to the same hash value, hash table collision happens. To handle this, in certain embodiments, a linked list of voxel entries are stored at each hash table slot. Whenever a new voxel entry is created, it is inserted to the end of the list at the corresponding hash table slot.

In certain embodiments, each voxel entry contains the integer coordinates of the voxel $(x_i, y_i, z_i)$, and each voxel also stores a density value d, which equals to how many points are bounded by this voxel. In certain embodiments, the method uses the density value d to filter out voxels that contain a small number of points (e.g. <50) during collision computation, thus removing possible outliers produced by VIO system.

After voxel hashing, the method according to certain embodiments creates multi-scale voxel representation. A unit voxel is defined as to have a length of one unit along all three axes of the coordinate space, or be defined as to have a scale level 0 along all three axes of the coordinate space. The unit size $m_v$ of a unit voxel can be controlled by the scaling integer S. For example, for metric coordinates, S=100 corresponds to $m_v$=1 cm, while S=10 corresponds to $m_v$=10 cm. A small S value leads to large voxel unit size and a large S value leads to small voxel unit size. If the $m_v$ is too small, the method may run into the risk of large memory footprint and higher computational cost for collision detection and avoidance. If my is too big, the resulting 3D representation might be over simplified and not tight enough. In certain embodiments, to mitigate this problem, the method introduces a multi-scale voxel hashing representation.

In certain embodiments, the key idea is to include a level value l at each voxel. In certain embodiments, the term level is used exchangeably with scale level. This allows the method to store voxels of different sizes in the hash table. For an input 3D point, the method first performs a search on the voxel entries stored in the hash table and check if the point is already encompassed by any voxel. Here, the 3D point may be encompassed by different voxels which are at different scale levels, and hash values of those voxels at different scale levels may be different from each other. The 3D point is compared with those voxel entries at different scale levels to find a match. If a voxel is not found, the method creates a new unit voxel at the smallest scale for this point. In the unit voxel, the integer coordinate $(x_i, y_i, z_i)$ and its scale level l=0 are stored.

Once the voxel is added to the hash table, the method uses a recursive procedure to merge neighboring voxels into higher level voxels. In certain embodiments, a straightforward way is used to merge uniformly along three axes. If all eight voxels that form a voxel at the next level are all present in the hash table, the eight voxels are removed and a new voxel at the higher level is inserted into the hash table. The density of the new voxel is the sum of all densities from the 8 smaller voxels. This procedure is repeated until no more voxels can be merged or a predefined maximum level of voxel is reached. For any voxel, the seven buddy voxels that form a voxel at the next level can be easily located from the hash table using integer division and multiplication. However, this method may not be efficient because it requires all eight voxels to be occupied before merging them. This is especially difficult for surface data where the interior of the scene is not visible.

In certain embodiments, to improve the efficiency, the method uses a different scale level for each of the three dimensions: $l_x, l_y, l_z$. After a new unit voxel is inserted into the hash table, the method merges the four voxels that form a voxel at the next level on two out of the three dimensions if possible. For example, if four voxels that form a larger voxel with x, y dimension at level 1 but z dimension at level 0, the method proceeds to merge these four voxels and insert a new voxel with $l_x=1, l_y=1, l_z=0$. In this way, planar structures that are approximately axis-aligned can be effectively represented.

In certain embodiments, the method adjusts the criterion for merging voxels to allow for more flexibility. In certain embodiments, when three out of four voxels that form a voxel at the next level are present in the hash table, the method creates a new voxel and removes the three voxels from the data structure.

In certain embodiments, the method merges two voxels along one axis if possible. In this way, a thin long structure can be represented using the method.

In certain embodiments, the voxels are axis-aligned. In other words, the voxels are aligned with the coordinate axes of the space, but these coordinate axes are not necessarily aligned with room orientation in the real world. They depend on the initial orientation of the mobile device when VIO system bootstraps camera tracking. To solve this problem, in certain embodiments, the method uses vertical plane detection to estimate the orientation of a room. For example, in an AR application according to certain embodiments of the disclosure, the executed AR application guides the user to scan the part of the scene with strong presence of vertical surfaces. Then, from the reconstructed 3D points, the application uses RNASAC algorithm to robustly estimate a plane that is perpendicular to the ground plane. The ground plane orientation can be estimated by motion sensing hardware on a mobile phone. When the number of inliers of the vertical plane is larger than a threshold, the application uses the normal of the plane as the new x-axis and transform all captured 3D points into the new coordinate system. In certain embodiments, a simple rotation is sufficient because they-axis always points to the opposite direction of gravity as detected by the motion sensing hardware in a VIO system like ARKit or ARCore.

In certain embodiments, collision detection can be efficiently computed using the multi-scale voxel representation according to the present disclosure. A digital object can be represented by a bounding box, a set of bounding boxes, a bounding cylinder, or even a set of polygons or voxels. In certain embodiments, a digital object is converted to a set of 3D points and the 3D points are represented by another set of multi-scale voxels. In certain embodiments, coordinates of vertices or points of a digital model are transformed using offset I and scaling factor S before collision computation, so that the virtual object and the voxel representation of the environment share the same coordinate space. At real time, the geometry is compared against all the multi-scale voxels. Because the voxels are all box-shaped, collision can be efficiently detected. For example, to detect collision between two boxes, the method only needs to check if two boxes overlap at all three dimensions, each requires two comparisons. This results in only 3*2=6 comparisons. In certain embodiments, a collision is detected only when the number of collided voxels with the digital object is larger than a threshold (e.g., 10) for robustness. In typical ARKit or ARCore applications, a horizontal support plane (ground or table surface) is first determined. Then a digital object is placed on the support plane for viewing and interaction. During collision detection, the method according to certain embodiments of the disclosure omits those voxels which are close enough to the support plane; otherwise, feature points from the support plane will lead to unintended collision with the digital object.

Implementation of the Disclosure

The present disclosure relates to computer systems. As depicted in the drawings, computer components may include physical hardware components, which are shown as solid line blocks, and virtual software components, which are shown as dashed line blocks. One of ordinary skill in the art would appreciate that, unless otherwise indicated, these computer components may be implemented in, but not limited to, the forms of software, firmware or hardware components, or a combination thereof.

The apparatuses, systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art.

FIG. 1 schematically depicts a computing device according to certain embodiments of the present disclosure, which may be a part of an AR system. The AR system may include one or more of the computing devices and one or more servers in communication with the computing devices. In certain embodiments, the computing device may be a mobile device, a tablet, a general-purpose computer, a headless computer, a wearable device, a specialized computer, a server computer, a cluster, or a cloud computer, which provide augmented reality services. In certain embodiments, the computing device is preferably one or more mobile devices, such as smart phones, wearable device, or tablets. As shown in FIG. 1, the computing device 100 may include, without being limited to, a processor 102, a memory 104, a storage device 106, one or more visual sensors 130, and one or more inertial measurement units (IMUs) 150. In certain embodiments, the computing device 100 may act as a server and receive and process a 3D map for reconstruction from an external device, and the visual sensors 130 and the IMUs 150 are not necessary. In certain embodiments, the computing device 100 may include other hardware components and software components (not shown) to perform its corresponding tasks. Examples of these hardware and software components may include, but not limited to, other required memory, interfaces, buses, Input/Output (I/O) modules or devices, Light Detection and Ranging (LIDAR) sensors network interfaces, and peripheral devices.

The processor 102 may be a central processing unit (CPU) which is configured to control operation of the computing device 100. The processor 102 can execute an operating system (OS) or other applications of the computing device 100. In some embodiments, the computing device 100 may have more than one CPU as the processor, such as two CPUs, four CPUs, eight CPUs, or any suitable number of CPUs.

The memory 104 can be a volatile memory, such as the random-access memory (RAM), for storing the data and information during the operation of the computing device 100. In certain embodiments, the memory 104 may be a volatile memory array. In certain embodiments, the computing device 100 may run on more than one memory 104.

The storage device 106 is a non-volatile data storage media for storing the OS (not shown) and other applications of the computing device 100. Examples of the storage device 106 may include non-volatile memory such as flash memory, memory cards, USB drives, hard drives, floppy disks, optical drives, or any other types of data storage devices. In certain embodiments, the computing device 100 may have multiple storage devices 106, which may be identical storage devices or different types of storage devices, and the applications of the computing device 100 may be stored in one or more of the storage devices 106 of the computing device 100. As shown in FIG. 1, the storage device 106 includes a 3D reconstruction application 110 ("Application"). The 3D reconstruction application 110 provides a platform for efficient augmented reality service, for example online shopping.

The 3D reconstruction application 110 includes, among other things, a 3D point map module 112, a 3D point receiving module 114, an integer computing module 116, a coordinate searching module 118, a voxel creation module 120, a hash value computing module 122, a hash table module 124, and a merging module 126. In certain embodiments, the 3D reconstruction application 110 may include other applications or modules necessary for the operation of the modules 112-126. It should be noted that the modules are each implemented by computer executable codes or instructions, or data table or databases, which collectively forms one application. In certain embodiments, each of the modules may further include sub-modules. Alternatively, some of the modules may be combined as one stack. In other embodiments, certain modules may be implemented as a circuit instead of executable code. In certain embodiments, some of the modules of the 3D reconstruction application 110, such as the 3D point map module 112, may be located at a remote computing device, and the other modules of the 3D reconstruction application 110 communicate with the 3D point map module 112 in the remote computing device via a wired or wireless network.

The 3D point map module 112 is configured to, upon receiving captured images from the visual sensors 130, calculate poses of the visual sensors 130 and construct 3D point map of the environment. The 3D point map module 112 may continuously update the 3D point map using the continuous captured 2D images from the visual sensors 130. In certain embodiments, the 3D point map module 112 performs SLAM using the captured images to obtain the 3D point map. The visual sensors 130 may be one or more cameras. The poses of the camera may be represented as a three-degree translation and a three-degree rotation, and the 3D map may be a point map that is formed as point cloud of feature points. Each feature point has a specific feature descriptor based on the feature of the corresponding feature point in the 2D images. In certain embodiments, the 3D point map module 112 fuses inertia data collected by the IMUs 150 with the visual data captured by the visual sensors 130 to establish the 3D point map. In certain embodiments, 3D point map module 112 may be provided by ARKit, ARCore, or other customized SLAM modules. The 3D point map may be a dense map or a sparse map. In certain embodiments, the 3D map is not limited to point-based map, and volume-based map can also be used as input for 3D reconstruction. In this embodiment, the map is created by the computing device 100. In other embodiments, the input 3D map may also be constructed by other computing devices in communication with the computing device 100.

The 3D point receiving module 114 is configured to receive a 3D point of the 3D point map from the 3D point map module 112. In certain embodiments, when the 3D point map module 112 updates its 3D point map, the updated points are sent to the 3D point receiving module 114 or retrieved by the 3D point receiving module 114, and the processing of the 3D point is one by one. The received information of the 3D point includes coordinate of the 3D point, for example, $(x_r, y_r, z_r)$, in the 3D point map. After receiving the 3D point, the 3D point receiving module 114 is configured to send the point to the integer computing module 116. In certain embodiments, the 3D points are received and processed one by one sequentially, or sometimes randomly. In other embodiments, the 3D point receiving module 114 may also receive or retrieve a batch of 3D points and process the batch of 3D points. In certain embodiments, the 3D point receiving module 114 may also receive the 3D points from another computing device and subsequently perform 3D reconstruction for the another computing device.

The integer computing module 116 is configured to, upon receiving the 3D point, specifically the coordinates of the 3D point $(x_r, y_r, z_r)$, convert the coordinates of the 3D point into an integer coordinates $(x_i, y_i, z_i)$, and send the integer coordinates to the coordinate searching module 118. The integer components of the 3D point's coordinates are used as input (key) to compute a hash value (hash code). Depending on the coordinate system of the 3D point map module 112, the coordinates of the 3D point $(x_r, y_r, z_r)$ may have limited number of digits. For example, in 3D point map prepared by ARKit, coordinates are specified in meters, and the measurement often gives 0 or 1 digit of integer components if measuring a regular sized room. The limited number of integer components easily causes too many 3D points to have the same hash value. To avoid too many voxel entries for the same hash value, the integer computing module 116 multiplies the original coordinates with a scaling integer S. Based on the distribution of the coordinate values in a 3D point map, the scaling integer S could be in the range of about 10-10,000. In certain embodiments, the scaling integer S is in a range of 20-500. In certain embodiments, the scaling integer S is in a range of 50-200. In certain embodiments, the scaling integer S is set at 100. Accordingly, for a point having coordinates of (0.0123, 0.0245, 0.0357) in the 3D point map, the integer computing module 116 multiplies the coordinates with the scaling integer S=100 to obtain scaled coordinates (1.23, 2.45, 3.57), removes the decimal components of the scaled coordinates, and keeps the integer components of the scaled coordinates to obtain the integer coordinates, that is (1, 2, 3). In certain embodiments, the coordinates of the 3D point in different dimensions may be respectively multiplied with different scaling integers. In an example, the scaling integers for the x, y, z dimensions are 120, 80, and 50, respectively. In certain embodiments, the scaling integers for the dimensions are determined based on the size and complexity along the dimensions. For example, if one of the dimensions is very narrow, the Application may use a large scaling integer for the dimension. In certain embodiments, at least one dimension of the coordinates $(x_r, y_r, z_r)$ of some 3D points may be negative. Under this situation, the integer computing module 116 is configured to, upon receiving every 3D point and before converting the coordinates of the 3D point $(x_r, y_r, z_r)$ into an integer coordinates $(x_i, y_i, z_i)$, transform the coordinates to positive coordinates and convert the positive coordinates to the integer coordinates. In certain embodiments, the transform may be performed by adding each dimension of the coordinates of the 3D point with a positive number, for example 10. In certain embodiments, the positive number is uniformly added to all three dimensions of the coordinates of each of the 3D points being processed. In certain embodiments, when both changing from negative to positive and integer scaling are needed, the coordinates $(x_r, y_r, z_r)$ may derive integer coordinates by adding a positive integer to $x_r$, $y_r$, $z_r$ first, then multiplying the three sums with a scaling integer to obtain scaled coordinates, and finally removing the decimal components and keeping the integer components to obtain the integer coordinates $(x_i, y_i, z_i)$.

The coordinate searching module 118 is configured to, upon receiving the integer coordinates of the 3D point from the integer computing module 116, check if the integer coordinates $(x_i, y_i, z_i)$ exist or are encompassed by any of the voxel entries, and if no, send the result to the voxel creation module 120, and if yes, send the result to the hash table module 124. In certain embodiments, the coordinate searching module 118 is configured to perform the checking using a linear search algorithm. In one example, there is a level 0 voxel entry in the hash table. The length of the voxel along the x, y, z axes are 1 unit, and the voxel has two vertices (1, 2, 3) and (2, 3, 4) out of the eight vertices. The vertex (1, 2, 3) is the corner of the level 0 voxel that is closest to the origin of the coordinate system, and is used to define the voxel. Kindly note the vertex of a voxel (either a level 0 or a higher-level voxel) that is closest to the origin of the coordinate system is regarded as, unless otherwise stated, the representative vertex of the voxel all through this disclosure, and are used for calculating the hash value of the voxel (in other embodiments, the representative vertex of the voxel may also be arbitrarily defined to be another one of the vertices; in a further embodiments, the hash value may also be calculated based on coordinates of a point located at a specific location within the voxel, and the point is not any of the vertices). If the coordinates of a newly received 3D point are (0.0123, 0.0245, 0.0357), the scaled coordinates of the 3D point are (1.23, 2.45, 3.57), and the integer coordinates of the 3D point are (1, 2, 3), then the 3D point is contained in the above level 0 voxel (1, 2, 3). In another example, there is a voxel entry in the hash table with $l_x=1$, $l_y=1$ and $l_z=1$. The length of the voxel along the x, y, z axes are 2 units, and the voxel has two vertices (2, 2, 2) and (4, 4, 4) out of the eight vertices. The vertex (2, 2, 2) is the corner of the voxel that is closest to the origin of the coordinate system, and is used to define the voxel together with $l_x=1$, $l_y=1$ and $l_z=1$. If the coordinates of a newly received 3D point are (0.0323, 0.0345, 0.0357), the scaled coordinates of the 3D point are (3.23, 3.45, 3.57), and integer coordinates of the 3D point are (3, 3, 3), then the 3D point is contained in the above level 1 voxel (2, 2, 2) with $l_x=1$, $l_y=1$ and $l_z=1$. In a further example, there is a voxel entry in the hash table with $l_x=1$, $l_y=1$ and $l_z=0$. The length of the voxel along the x, y, z axes are 2, 2, and 1 units respectively, and the voxel has two vertices (2, 2, 0) and (4, 4, 1) out of the eight vertices. The vertex (2, 2, 0) is the corner of the voxel that is closest to the origin of the coordinate system, and is used to define the voxel together with $l_x=1$, $l_y=1$ and $l_z=0$. If the coordinates of the 3D point are (0.0323, 0.0345, 0.0057), the scaled coordinates of the 3D point are (3.23, 3.45, 0.57), the integer coordinates of the 3D point are (3, 3, 0), then the 3D point is contained in the above voxel (2, 2, 0) with $l_x=1$, $l_y=1$ and $l_z=0$. In other words, the coordinate searching module 118 would confirm that the search result is yes.

In certain embodiments, the coordinate searching module 118 is configured to, upon receiving the integer coordinates of the 3D point from the integer computing module 116, check if the integer coordinates exist or encompassed by voxel entries of any level using integer division and multiplication. Specifically, for 3D point having scaled coordinates (4.1, 5.2, 6.3), the integer coordinates are (4, 5, 6). The coordinate searching module 118 first is configured to identify if the integer coordinates have a corresponding level 0 voxel. The coordinate searching module 118 calculates the hash value (level 0 hash value) using integer coordinate (4, 5, 6), and the hash value for example is 133. Then the coordinate searching module 118 checks all the voxel entry (entries) stored within the slot 133. If one of the level 0 voxel entries in the slot 133 has the integer coordinates (4, 5, 6), the coordinate searching module 118 determines that the integer coordinates (4, 5, 6) exist or are encompassed by that voxel. If not, the coordinate searching module 118 further checks level 1 voxels.

When the coordinate searching module 118 determines that the integer coordinate (4, 5, 6) don't have a matched level 0 voxel, then the module is configured to identify if the integer coordinates (4, 5, 6) have a corresponding level 1 voxel by integer division and multiplication. The coordinate searching module 118 performs division by 2 ($2^1$) and multiplication by 2 ($2^1$) to the integer coordinates (4, 5, 6), that is, 4/2*2=4, 5/2*2=4, 6/2*2=6, and the result is (4, 4, 6), which corresponding to the vertex of the corresponding level 1 voxel that is closest to the origin. In other words, the uniform level 1 voxel is defined by its vertex (4, 4, 6) and has a length of 2 units along each one of axis x, y and z. The coordinate searching module 118 calculates a hash value (level 1 hash value) using the integer coordinates (4, 4, 6), and the hash value for example is 157. Then the coordinate searching module 118 checks the level 1 voxel entry (entries) stored within the slot 157, if one level 1 voxel entry indexed by the hash value contains the integer coordinates (4, 4, 6), the coordinate searching module 118 determines that the integer coordinates (4, 5, 6) are contained in the voxel. If not, the coordinate searching module 118 further checks level 2 voxels.

The above embodiment is performed when dealing with uniform voxels. In other embodiments, if the Application searches for a voxel with different scale values along the three axes, for example $l_x=1$, $l_y=1$, $l_z=0$, it will perform searching using ($4/2^1*2^1=4$, $5/2^1*2^1=4$, $6/2^0*2^0=6$) as integer coordinates. In other words, when search for level 1, the Application will search for $l_x=1$, $l_y=1$, $l_z=0$; then $l_x=0$, $l_y=1$, $l_z=1$; then $l_x=1$, $l_y=0$, $l_z=1$, then $l_x=1$, $l_y=0$, $l_z=0$; then $l_x=0$, $l_y=1$, $l_z=0$; then $l_x=0$, $l_y=0$, $l_z=1$.

When the coordinate searching module 118 determines that the integer coordinate (4, 5, 6) don't have a matched level 1 voxel, then the module is configured to identify if the integer coordinates (4, 5, 6) have a corresponding level 2 voxel by integer division and multiplication. The coordinate searching module 118 performs division by 4 ($2^2$) and multiplication by 4 ($2^2$) to the integer coordinates (4, 5, 6), that is, 4/4*4=4, 5/4*4=4, 6/4*4=4, and the result is (4, 4, 4), which corresponding to the vertex of the corresponding uniform level 2 voxel that is closest to the origin. In other words, the level 2 voxel is defined by its vertex (4, 4, 4) and has a length of 4 units along each one of axis x, y and z. The coordinate searching module 118 calculates a hash value (level 2 hash value) using the integer coordinates (4, 4, 4), and the hash value for example is 17. Then the coordinate searching module 118 checks the level 2 voxel entry (entries) stored within the slot 17, if one level 2 voxel entry is defined as (4, 4, 4), the coordinate searching module 118 determines that the integer coordinates (4, 5, 6) are contained in that voxel (4, 4, 4). If not, the coordinate searching module 118 further checks level 3 voxels.

The coordinate searching module 118 is then configured to check the next level. Generally, for level n, the coordinate searching module 118 performs integer division by $2^n$ and multiplication by $2^n$ to the integer coordinates (4, 5, 6), that is, $4/2^n*2^n=a$, $5/2^n*2^n=b$, $6/2^n*2^n=c$ (a, b and c are positive integers), and the result is (a, b, c), which corresponds to the vertex of the corresponding uniform level n voxel that is closest to the origin, i.e., corresponding to the representative vertex of the level n voxel. In other words, the uniform level n voxel is defined by its vertex (a, b, c) and has a length of $2^n$ units along each one of axis x, y and z. The coordinate searching module 118 calculates a hash value (level n hash value) using the integer coordinates (a, b, c), and the hash value for example is $H_n$. Then the coordinate searching module 118 checks the voxel entry (entries) stored within the slot $H_n$, if one level n entry defined by the integer coordinates (a, b, c) is available, the coordinate searching module 118 determines that the integer coordinates (4, 5, 6) are contained in the voxel (a, b, c). If not, the coordinate searching module 118 further checks level n+1 voxels.

The Application has a threshold level that needs to be checked, which is in the range of 2-20. In certain embodiments, the threshold level is in the range of 5-10. In on embodiment, the threshold is 9. If the coordinate searching module 118 checks the voxel entries from level 0 to the threshold level and find no match, the module determines that the search result is no. During the process of checking from low level to high level, whenever the coordinate searching module 118 checks a voxel entry contains the integer coordinates of the 3D point, the check stops and the coordinate searching module 118 determines that the search result is yes.

As described above, the coordinate searching module 118 is configured to determine whether the integer coordinates exist or are contained in the hash table entries by: determining a vertex of a level n voxel corresponding to the integer coordinates, where the vertex is closest to the origin; and check whether there is a level n entry in the hash table that is defined by the vertex. The vertex can be determined using integer division and multiplication but is not limited thereto. In certain embodiments, the vertex of a uniform level n voxel (the vertex closest to the origin of the 3D space) is determined as follows:

$$(a)*2^n <= x_i <= (a+1)*2^n;$$

$$(b)*2^n <= y_i <= (b+1)*2^n; \text{ and}$$

$$(c)*2^n <= z_i <= (c+1)*2^n,$$

where ($x_i$, $y_i$, $z_i$) are integer coordinates of the 3D point, a, b and c are positive integers, and ($a*2^n$, $b*2^n$, $c*2^n$) are the integer coordinates of the vertex of the level n voxel. When a level n voxel defined by ($a*2^n$, $b*2^n$, $c*2^n$) is found in the hash table, the coordinate searching module 118 determines that the integer coordinates ($x_i$, $y_i$, $z_i$) exist or are contained in the hash table.

Kindly note that for a level n voxel, the voxel may be level n along one, two or, three axes, but not necessarily level n along all three axes. For example, a level n voxel may be level n along x axis, level (n−1) along y axis, and level 0 along z axis.

In certain embodiments, the coordinate searching module 118 is further configured to, when the integer coordinates of the 3D point is not contained in any voxel entries in the hash table, instruct the voxel creation module 120 to create a new unit voxel corresponding to the coordinates; and when the coordinate of the 3D point is contained in a voxel entry in the hash table, instruct the hash table module 124 to add the information, specifically the density, of the 3D point to the voxel entry in the hash table.

The voxel creation module 120 is configured to, upon receiving the instruction from the coordinate searching module 118, create the new unit voxel. A unit voxel is defined to have scale level 0. The scale level 0 voxel has a unit length, which may be predetermined or calculated based on the scene recognition. The voxel creation module 120, once created the new voxel, is further configured to fill up the information of the new voxel. Specifically, the voxel creation module 120 is configured to instruct the hash value computing module 122 to compute the hash value of the voxel; prepare the voxel entry using the integer coordinates, and the scale level; and send the prepared voxel entry to the hash table module 124.

The hash value computing module 122 is configured to, upon receiving the instruction (to compute the corresponding hash value) and inputs (integer coordinates) from the voxel creation module 120, compute the hash value of the 3D point, and send the hash value to the hash table module 124. In certain embodiments, the hash value computing module 122 is configured to calculate the hash value of the 3D point using the formula (1), $$H(x_i, y_i, z_i) = (x_i * p_1 \oplus y_i * p_2 \oplus z_i * p_3) \bmod n \quad (1)$$

The H ($x_i$, $y_i$, $z_i$) is the hash value of the 3D points having the integer coordinates $x_i$, $y_i$, and $z_i$. The $x_i$, $y_i$ and $z_i$ are integer coordinates of the 3D point, which includes only integer components of the scaled coordinates of the 3D point. The $p_1$, $p_2$, and $p_3$ are large prime numbers, and n is the number of slots in the hash table. A larger n reduces the possibility of hash value collision and thus reduces the number of linked entries in the hash table slots. Accordingly, a large n will improve performance, but requires more space to store the hash table. In certain embodiments, the Application sets the number n in a range of 256-65536. In certain embodiments, the Application sets the number n in a range of 1024-16384. In one embodiment, the Application sets the number n as 4096. The number n may or may not be a power of 2.

In certain embodiments, the Application may not include a specific hash value computing module 122, and the hash value of integer coordinates may be calculated by the coordinate searching module 118 during the searching process.

The hash table module 124 is configured to, upon receiving the hash value from the hash value computing module 122 and the assembled voxel entry of the 3D point from the voxel creation module 120, and insert the voxel entry to the hash table. Specifically, now the voxel entry corresponding to the 3D point includes integer coordinates and scale level. In certain embodiments, the voxel entry is in the form of 5-tuple, i.e., {$x_i$, $y_i$, $z_i$, l, d}, where $x_i$, $y_i$, $z_i$ are integer coordinates of the representative vertex of the voxel, l is the scale level (here l=0 because the newly created unit voxel is at the minimum level 0), and d is the density of the voxel. In certain embodiments, the density represents the number of points in the voxel. Because this newly created voxel is based on the one 3D point, in other words, there is only one point in the voxel, thus d=1. Therefore, for this point, the voxel entry is {$x_i$, $y_i$, $z_i$, 0, 1}.

In certain embodiments, to indicate different scale levels along different coordinate dimensions, the voxel entry is in the form of 7-tuple, i.e., {$x_i$, $y_i$, $z_i$, $l_x$, $l_y$, $l_z$, d}, where $x_i$, $y_i$, $z_i$ are integer coordinates of the representative vertex of the voxel, $l_x$, $l_y$, $l_z$, are the scale levels along the x, y and z direction (here $l_x$=0, $l_y$=0, $l_z$=0 because the newly created unit voxel is at the minimum level 0 at all dimensions), and d is the density of the voxel. Accordingly, for this point, the voxel entry is {$x_1$, $y_1$, $z_1$, 0, 0, 0, 1}. Kindly note that the hash table module 124 is configured to set the hash table any time before inserting the first voxel. In certain embodiments, the hash table module 124 of the Application allocates an empty hash table at the beginning of running the Application, where the empty hash table is an array having, for example 4096 empty elements.

Figure 2A:
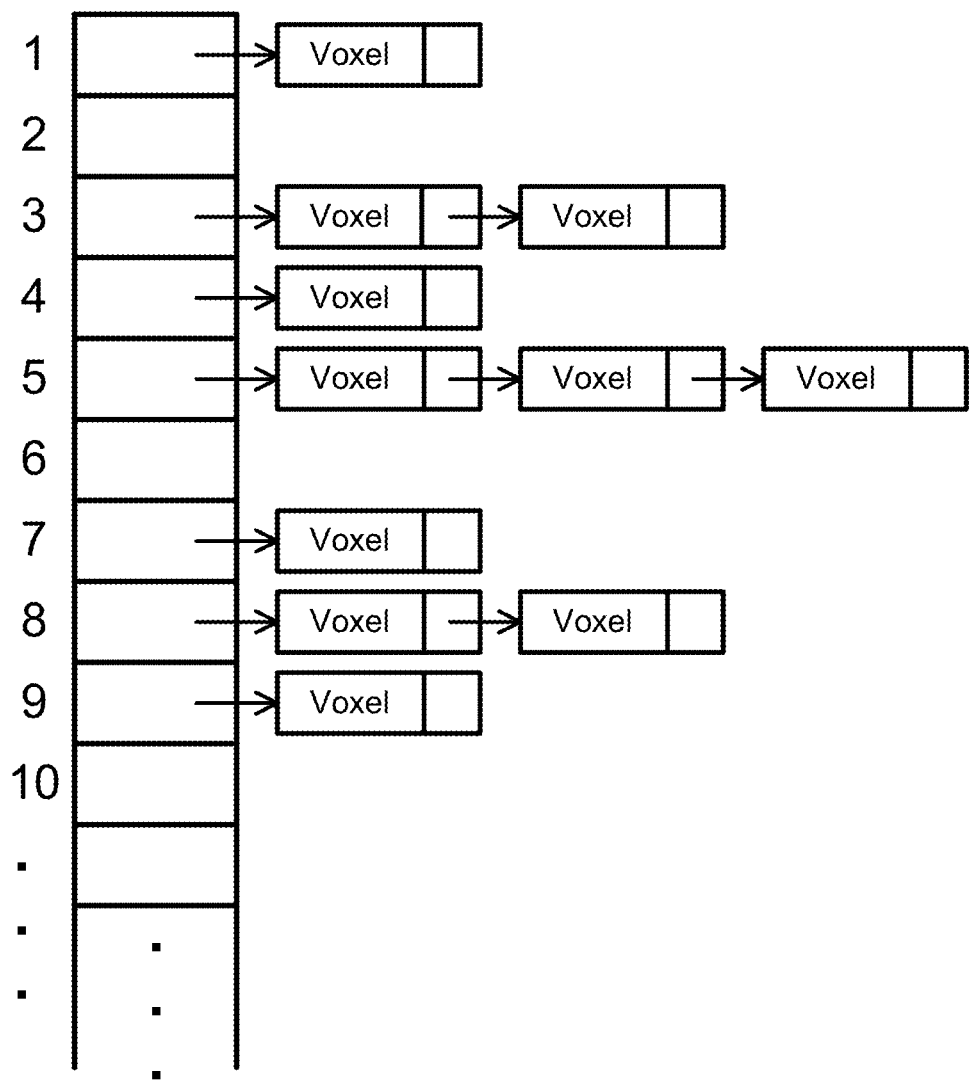
FIGS. 2A-2C schematically depicts a hash table structure according to certain embodiment of the present disclosure.
Figure 2B:
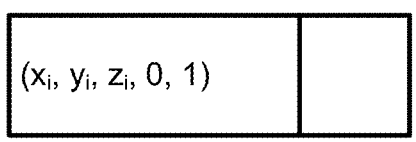
Figure 2C:
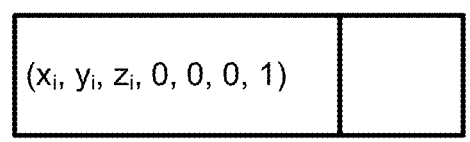

FIG. 2A shows a hash table entry structure according to certain embodiments of the present disclosure. As shown in FIG. 2A, the voxel hash table has indices 1-10 . . . , corresponding to hash value of the entries calculated using formula (1). The value of the voxel entry (not hash value) is in the form of 5-tuple as shown in FIG. 2B or 7-tuple as shown in FIG. 2C. Each hash table slot may be vacant such as index numbers 2, 6 and 10, may point to one voxel entry such as index numbers 1, 7 and 9, or may point to a list of several voxel entries such as index numbers 3, 5 and 8. In certain embodiments, when voxels have the same index (or hash value), the hash table may use a chaining mechanism to store multiple voxel entries. For example, when multiple voxels map to the same hash value, a linked list of voxel entries is stored at each hash table slot. Whenever a new voxel entry is created, it is inserted to the end of the list at the corresponding hash table slot. Kindly note the list of voxel entries having the same hash value may be remote in the 3D space of the voxel representation.

In certain embodiments, the hash table module 124 is further configured to construct the hash table beforehand. For example, the hash table module 124 may instruct the 3D point receiving module 114 to receive a plurality of 3D points as a batch, instruct the integer computing module 116 to convert coordinates of the 3D points to integer coordinates, instruct the voxel generating module 120 to generate unit voxels for each of the 3D points, instruct the hash value computing module 122 to calculate hash value of each 3D point based on corresponding integer coordinates, and construct the voxel entries using the integer coordinates, the scale levels along each axis in the coordinate space (here all the levels are 0, the minimum scale, along the three axes), and the densities of the voxels. In certain embodiments, a merging step is performed to simplify the hash table.

The merging module 126 is configured to, when the new unit voxel entry of the 3D point is inserted into the hash table, perform recursive merging on the newly added voxel entry. As described above, the newly added unit voxel entry in the hash table has a value of ($x_i$, $y_i$, $z_i$, 0, 0, 0, 1). The merging module 126 is configured to perform merging of the voxel with the neighboring voxels along the x and y axis (or xy-plane) first by fixing the z direction at the scale level 0. Specifically, the new voxel has an x neighboring voxel along the x direction where the new voxel and the x neighboring voxel belong to the same voxel at the next level, level 1, along the x axis. The x neighboring voxel is either to the left or to the right of the new voxel. Further, the new voxel has a y neighboring voxel along the y direction where the new voxel and they neighboring voxel belong to the same voxel at the next level, level 1, along they direction. They neighboring voxel is either above or below the new voxel. The new voxel, the x neighboring voxel, they neighboring pixel, and another voxel adjacent to the x neighboring voxel along they direction and adjacent to they neighboring pixel along the x direction, together forms a unit at the next level, level 1. The level 1 voxel includes four level 0 voxels in the xy-plane. When each of the four level 0 voxels is available in the hash table, the merging module 126 is configured to merge the four level 0 voxels to a merged level 1 voxel, and delete the four level 0 voxels. Each of the voxels may be defined by the coordinates of the vertex of the voxel that is closest to the origin, the scale levels along the x, y, z axes, and the density d, which is the sum of the densities of the four low level voxels.

When the scale level 0 to scale level 1 merging is successful in the x and y directions or xy-plane, the merging module 126 further tries to perform merging from scale level 1 to scale level 2 in the xy-plane, which is similar to the process described above in regard to the merging from scale level 0 to scale level 1. The merging can be performed recursively until no merging is available at a scale level (lacking at least one lower level voxel unit), or the merging has reached a predetermined level, for example, the merging stops at a predetermined scale level. In certain embodiments, the predetermined scale level or the threshold of stopping merging is in a range of 3-20. In certain embodiments, the threshold is in a range of 5-12. In certain embodiments, the threshold is 9.

After performing merging in the xy-plane, the merging module 126 is further configured to perform merging similarly in the yz-plane, followed by perform merging in the xz-plane. In certain embodiments, the merging module 126 performs the merging in the yz-plane when the merging in the xy-plane is not successful. In certain embodiments, the merging module 126 performs the merging in the xz-plane when the merging in the xy-plane is not successful, and the merging in the yz-plane is not successful. In certain embodiments, the merging in the xy-plane, in the yz-plane, and in the xz-plane may be attempted in a different arbitrary sequence or in a sequence based on the characteristics of the scene. In certain embodiments, even if merging in one plane is successful for one or more rounds, a subsequent merging on one or two other planes are attempted, where cuboid-shaped voxels may be merged. For example, a cuboid-shaped voxel having vertices (0, 0, 0) and (2, 2, 1) may be merged with another cuboid-shaped voxel having vertices (0, 0, 1) and (2, 2, 2) so as to form a uniform level 1 voxel having vertices (0, 0, 0) and (2, 2, 2).

In the embodiments described above, the criteria for merging four low-level voxels to a higher-level voxel is that the four voxels each contain at least a point. In certain embodiments, the criteria may vary, for example, as long as three of the four low-level voxels contain points, the three low-level voxels can be combined to form a higher-level voxel.

In the above described embodiments, the merging in different dimensions can be different from each other, thus form a non-uniform multi-scale voxel representation of the 3D map. In other embodiments, merging in different dimensions can be uniform, so that the 3D map can be represented by uniform multi-scale voxels.

FIG. 3A schematically shows a uniform multi-scale voxel merging according to certain embodiments of the present disclosure. In certain embodiments, the uniform merging is performed by the merging module 126. As shown in FIG. 3A, eight neighboring level 0 voxels are respectively defined as follows:

{0, 0, 0, 0, 2};
{0, 1, 0, 0, 2};
{1, 1, 0, 0, 1};
{1, 0, 0, 0, 1};
{0, 0, 1, 0, 1};
{0, 1, 1, 0, 1};
{1, 1, 1, 0, 2}; and
{1, 0, 1, 0, 2}.

The voxel entry or value has the format of 5-tuple, i.e., $\{x, y, z, l, d\}$. x, y, z are integer coordinates of the representative vertex of the voxel that is closest to the origin. l is the scale level, here all l equals to 0. d is the density of the voxel, or number of points in the voxel, which is one or two in FIG. 3A. The eight voxels in level 0 belong to the same level 1 voxel. Because each of the eight level 0 voxels belonging to the one level 1 voxel contains at least one point, the merging module 126 is configured to merge the eight voxels to one single voxel at level 1. The merged level 1 voxel is represented by:

{0, 0, 0, 1, 12}.

The voxel entry value {0, 0, 0, 1, 12} means that the representative vertex of the level 1 voxel has a coordinate of 0, 0, 0; the level of the voxel is 1; and the density of the voxel is 12, i.e., a total of 12 points contained in the level 1 voxel. The merging of the low-level voxels along the x, y, z axes are the same, and the merging is named uniform merging.

FIG. 3B schematically shows a non-uniform multi-scale voxel merging according to certain embodiments of the present disclosure. In certain embodiments, the multi-scale voxel merging is performed by the merging module 126. As shown in FIG. 3B, six scale level 0 voxels are respectively:

{0, 0, 0, 0, 0, 0, 2};
{0, 1, 0, 0, 0, 0, 2};
{1, 1, 0, 0, 0, 0, 1};
{1, 0, 0, 0, 0, 0, 1};
{0, 0, 1, 0, 0, 0, 1}; and
{1, 0, 1, 0, 0, 0, 1}.

The voxel entry or value has the format of 7-tuple, i.e., $\{x_i, y_i, z_i, l_x, l_y, l_z, d\}$. $x_i, y_i, z_i$ are integer coordinates of the representative vertex of the voxel that is closest to the origin; $l_x, l_y, l_z$ are the scale levels along x, y, z axes, here all l equals to 0; d is the density of the voxel, or number of points in the voxel, which is one or two in the figure. The six available voxels at scale level 0 belong to the same level 1 voxel, if uniform multi-scale merging is used. However, the voxel representation lacks the other two scale level 0 voxels of the eight level 0 voxels, and cannot be merged using uniform merging on three dimensions. In certain embodiments, the merging module 126 is configured to merge four low-level voxels along two dimensions instead of three dimensions. As shown in FIG. 3B, the merging module 126 is configured to check whether there are four low-level voxels along the x and y axes. When the four low-level voxels are available, the merging module 126 is configured to combine the four low-level voxels to one voxel and is defined by {0, 0, 0, 1, 1, 0, 6}. The combined voxel has scale level 1 along x and y axes, and has a scale level 0 along the z axis. The merged voxel contains 6 points. In certain embodiments, if merging in xy-plane is not available, the merging module 126 further tries merging in yz-plane. If merging is not available in xy-plane and yz-plane, the merging module 126 may further try merging in xz-plane. By the non-uniform multi-scale merging, planar surface such as a wall or a table surface can be accurately represented with a simple voxel structure.

In certain embodiments, the merging module 126 may merge voxels along one axis when the merging along two or three axes are not available. Under this situation, a bar shaped structure may be represented efficiently, extending along one of the x, y, z directions.

The visual sensors 130 is configured to capture visual images of the environment, and may be one or two red, green and blue (RGB) cameras. In certain embodiments, the visual sensors 130 may also include grayscale cameras, RGB depth (RGBD) cameras, and depth cameras. In certain embodiments, the computing device may further include one-dimensional (single beam) or 2D-(sweeping) laser rangefinders, 3D High Definition LiDAR, 3D Flash LIDAR, 2D or 3D sonar sensors. The visual sensors 130 is controlled to capture environment images in real time at a predetermined frame rate continuously. The IMUs 150 may include accelerometers, gyroscopes, and magnetometers. The computing device 100 would instruct the IMUs 150 to collect specific force, angular rate, and optionally magnetic field at real time.

Figure 4:
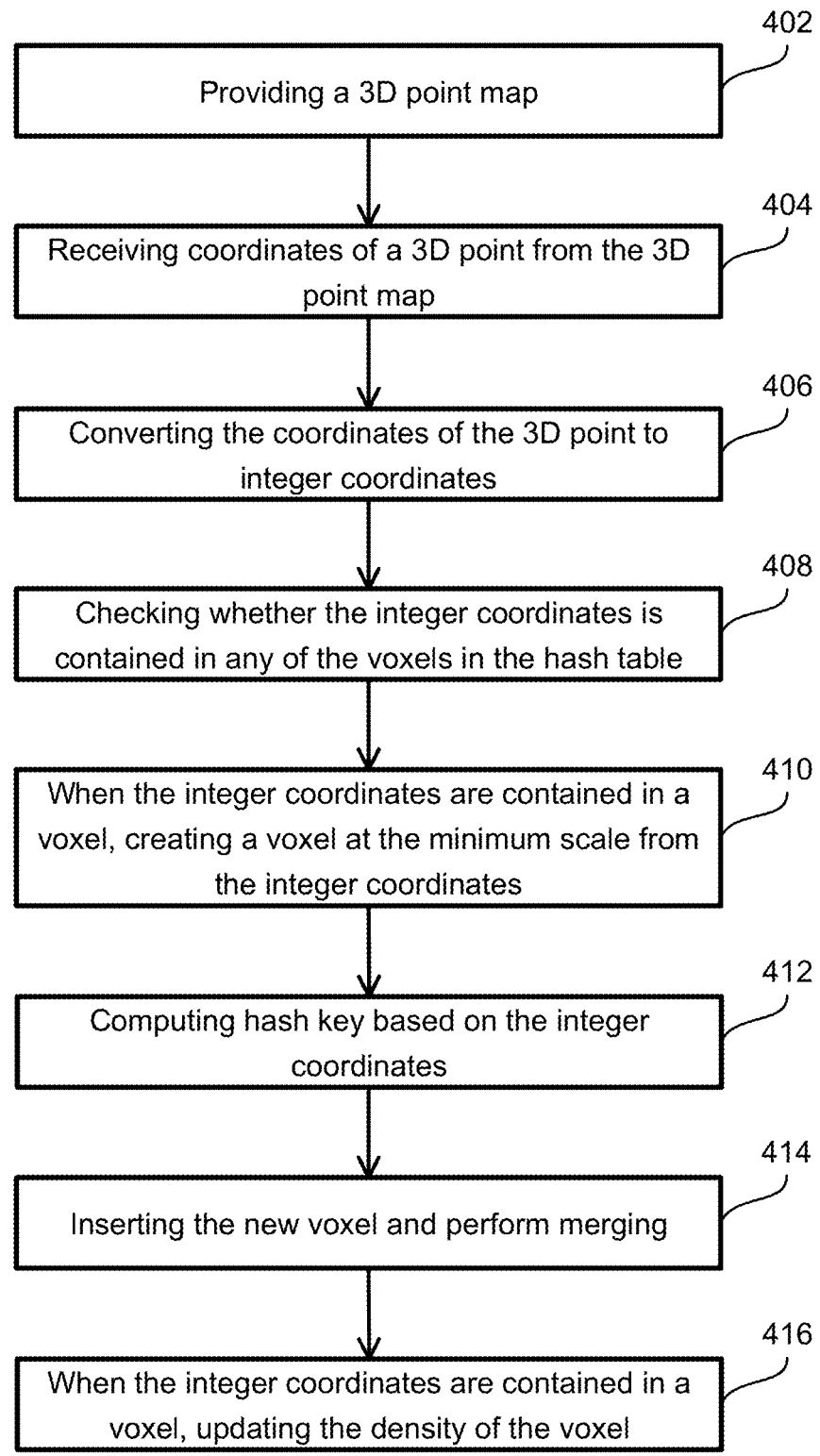
FIG. 4 depicts a method of reconstructing a three-dimensional map by multi-scale voxel hashing according to certain embodiments of the present disclosure.

FIG. 4 depicts a method of reconstructing a three-dimensional (3D) map by multi-scale voxel hashing according to certain embodiments of the present disclosure. In certain embodiments, the method is implemented by the computing device shown in FIG. 1. It should be particularly noted that, unless otherwise stated in the present disclosure, the steps of the method may be arranged in a different sequential order, and are thus not limited to the sequential order as shown in FIG. 4.

As shown in FIG. 4, at procedure 402, the 3D point map module 112 provides a 3D point map. In certain embodiments, the 3D point map module 112 generates the 3D point map by a VIO system, for example, by performing SLAM using a plurality of images and optionally inertia information. In certain embodiments, the provided 3D point map is a 3D sparse point map, and each 3D point has a coordinate of $(x_i, y_i, z_i)$ in the 3D space of the point cloud data. In certain embodiments, this step of providing 3D point map may be performed in a remote computing device. In certain embodiments, instead of a point-based map, the system can also process a volume-based map.

At procedure 404, the 3D point receiving module 114 of the computing device 100 receives or retrieves a 3D point from the 3D point map module 112, and then sends the coordinates of the 3D point to the integer computing module 116. The received information of the 3D point includes the coordinates of the 3D point, i.e., $(x_r, y_r, z_r)$, in the 3D point map. In other embodiments, the method may also process multiple points by batch.

At procedure 406, upon receiving the 3D point having the coordinate of $(x_r, y_r, z_r)$, the integer computing module 116 multiplies the coordinate $(x_r, y_r, z_r)$ with a scaling integer S and removes the decimal components to obtain integer coordinates $(x_i, y_i, z_i)$. In one example, for coordinates (0.0123, 0.0245, 0.0357), the integer computing module 116 uses a scaling integer of 100 to multiply the coordinates to obtain the scaled coordinates (1.23, 2.45, 3.57), and remove the decimal components from the scaled coordinates to obtain integer coordinate (1, 2, 3). The integer computing module 116 then sends the converted integer coordinates to the coordinate searching module 118. In certain embodiments, when negative value exists for a dimension of a 3D point being processed, the integer computing module 116 transforms the coordinates into positive coordinates and then converts the positive coordinates to integer coordinates, as described above.

In certain embodiments, the scaling factor is determined based on the characteristics of different scenes or different portions of a scene. A large scaling factor leads to smaller unit voxels and makes a high resolution representation for a complicated scene, while a small scaling factor leads to larger unit voxel and makes a low resolution representation for a simple scene. In certain embodiments, for different scenes for example an office kitchen, a storage room, a table, and a conference room, a sequence of point clouds and images are captured for each of the scenes (this analysis may be performed offline). Inter-point distance varies for different scenes. When a scene is closer to the camera, the reconstructed points are closer to each other, requiring smaller unit voxels to better approximate the geometry of the scene. The scene depth is estimated from a sequence of initial frames by averaging the distances from scene points to the camera, and the depth is used to determine the unit voxel size $m_v$. In certain embodiments, the following determined thresholds are used:

$m_v$=2 centimeter (cm), D<0:75 meter (m);
$m_v$=4 cm, 0.75 m<D<1 m; and
$m_v$=8 cm, D>=1 m,
where D is the initial scene depth.

In certain embodiments, $m_v$=2 cm, which equals to S=50 in a metric system.

At procedure 408, the coordinate searching module 118 performs search using the integer coordinates of the 3D point against the voxel entries in the hash table, to determine whether there is a voxel entry encompassing the 3D point. Specifically, the procedure 408 is performed by checking whether the integer coordinates of the 3D point $(x_i, y_i, z_i)$ are located within the cube of any of the voxels.

In certain embodiments, the search in the procedure 408 is performed sequentially from level 0 to the threshold level until a match is found. In certain embodiments, the threshold level is in a range of from 3-9. At each level, the corresponding hash value of the integer coordinates of the representative vertex of the voxel is calculated, and the voxel entries at that level and correspond to the hash value are compared. The following is an example of how the Application performs a level m search. At first, the Application determines coordinates of a vertex of a level m voxel that containing the 3D point as $(x_i/2^m*2^m, y_i/2^m*2^m, z_i/2^m*2^m)$, each of the $x_i/2^m, y_i/2^m, z_i/2^m$ being an integer division. Then the Application calculates a hash value of the uniform level m voxel based on the integer coordinates $(x_i/2^m*2^m, y_i/2^m*2^m, z_i/2^m*2^m)$. After that, the Application compares the integer coordinates $(x_i, y_i, z_i)$ with coordinates of uniform level m voxel entries indexed by the hash value. In other words, for the specific hash value, there are a number of voxel entries at different voxel levels, and the Application compare the integer coordinates of the 3D point with the level m voxels only, not other lower level or higher-level voxels. When the Application finds the integer coordinates $(x_i, y_i, z_i)$ are encompassed by any one of the level m voxel entries indexed by the hash value, the Application determines that the integer coordinates $(x_i, y_i, z_i)$ are contained in the voxel entry in the hash table, and stops further searching. When the level 0 to the threshold level have been searched and no match is found, the Application determines that the 3D point is not contained in any voxel entries in the hash table. In certain embodiments, when the level m voxel is not a uniform level m voxel, that is, only one or two axes of the voxel is level m, and the other one or two axes of the voxel has a level lower than m; then the integer division may be performed respectively based on the scale level along different axes, and the search is performed accordingly.

When a voxel enclosing $(x_i, y_i, z_i)$ is not found, at procedure 410, the coordinate searching module 118 instructs the voxel creation module 120 to create a new unit voxel corresponding to the 3D point at the minimum scale, i.e., scale level 0 along all three axes.

At procedure 412, once the new voxel is created, the voxel creation module 120 instructs the hash value computing module 122 to calculate a hash value using the hash value formula (1) based on the integer coordinate $(x_i, y_i, z_i)$ of the 3D point.

At procedure 414, the hash table module 124 inserts the voxel as a new entry of the hash table and performs merging based on the insertion of the new voxel. In certain embodiments, when a hash table is not available yet, the hash table module 124 can also construct a hash table. The hash table includes the single voxel—the new voxel in one slot, and all the other slots of the hash table are empty.

In certain embodiments, the hash table module 124 may construct the hash table having a plurality of voxels before the procedure 404. For example, the hash table module 124 may instruct the 3D point receiving module 114 to receive a plurality of 3D points as a batch, instruct integer computing module 116 to convert coordinates of the 3D points to integer coordinates, instruct the voxel creation module 120 to generate unit voxels at minimum scale for each of the 3D points using integer coordinates of the 3D point, the scale levels along each axis in the coordinate space (here all is level 0, the minimum scale), and the density of the voxel (here 1 for a single point), instruct the hash value computing module 122 to calculate hash value of each 3D points based on corresponding integer coordinate, and construct the hash table using the voxel entries or insert the voxel entries to a pre-created empty hash table, In certain embodiments, a merge step is performed to simplify the initiated hash table.

After insertion, the merging module 126 performs recursive merging on the newly added voxel entry of the 3D point. The new voxel entry in the hash table has a format of $(x_i, y_i, z_i, l_x, l_y, l_z, d)$, where $x_i, y_i, z_i$ are integer coordinates of the representative vertex, $l_x, l_y, l_z$ are scale levels of the new voxel along x, y, and z axis, and d is the density of the point in the 3D point map. When the voxel contains one point, d=1. Because the new unit voxel is created in the minimum scale level along x, y, z axis, here the representation of the voxel is $(x_i, y_i, z_i, 0, 0, 0, 1)$. The merging module 126 first performs merging of the voxel with the neighboring voxels along the xy-plane (by fixing the z direction in the scale level 0). Specifically, the new voxel has an x neighboring voxel along the x direction where the new voxel and the x neighboring voxel belong to the same unit at the next level, level 1, along the x direction. The x neighboring voxel is either to the left or to the right of the new voxel. Further, the new voxel has a y neighboring voxel along they direction where the new voxel and they neighboring voxel belong to the same voxel; at the next level, level 1, along the y direction. They neighboring voxel is either above or below the new voxel. The new voxel, the x neighboring voxel, they neighboring pixel, and another voxel adjacent to the x neighboring voxel along they direction and adjacent to they neighboring pixel along the x direction, together form a voxel in the next level, here level 1. The level 1 voxel includes four scale level 0 voxels. When each of the four scale level 0 voxels is available in the hash table, the merging module 126 merges the four scale level 0 voxels to a merged voxel at a level 1 along two axes. The x, y, z coordinates of the merged voxel is the predetermined coordinates for the new voxel, such as the vertex that is closest to the origin; the scale level of the new voxel is (1, 1, 0), where the scale level along the x and y axis is 1, and the scale level along the z axis is 0; and the density d is the sum of the densities in all four level 0 voxels, i.e., the total number of points in the four scale level 0 voxels.

When the scale level 0 to scale level 1 merging is successful along the xy-plane, the merging module 126 further performs merging from scale level 1 to scale level 2 in the xy-plane, which is similar to the process described above in regard to the merging from scale level 0 to scale level 1. The merging can be performed recursively until no merging is possible at a certain scale level (lacking at least one lower level voxel of the four lower level voxels), or the merging has reached a predetermined level, for example, the merging stops at level 9.

After performing merging along the xy-plane, the merging module 126 further performs merging similarly along the yz-plane, followed by performing merging along the xz-plane. In certain embodiments, the merging module 126 performs the merging in the yz-plane when the merging in the xy-plane is not successful. In certain embodiments, the merging module 126 performs the merging in the xz-plane when both the merging in the xy-plane and the merging in the yz-plane are unsuccessful.

When the merging is completed, the merging module 126 instructs the 3D point receiving module 124 to receive new 3D points from the 3D point map module 122, and repeat the procedures 404-414 for the new 3D point.

In addition, after procedure 408, when a voxel in the hash table is found to contain the integer coordinates of the new 3D point, the coordinate searching module 118 sends the 3D point information to the hash table module 134, and the hash table module 134, at procedure 416, updates the density of the voxel that is found. Specifically, the corresponding voxel may be a voxel at any scale level, as long as the integer coordinates of the new 3D point is within the cuboid of the voxel. The density of the corresponding voxel is increased by 1, which means one more 3D point is found within the voxel.

By completing the above process, a multi-scale voxel representation is created.

Figure 5A:
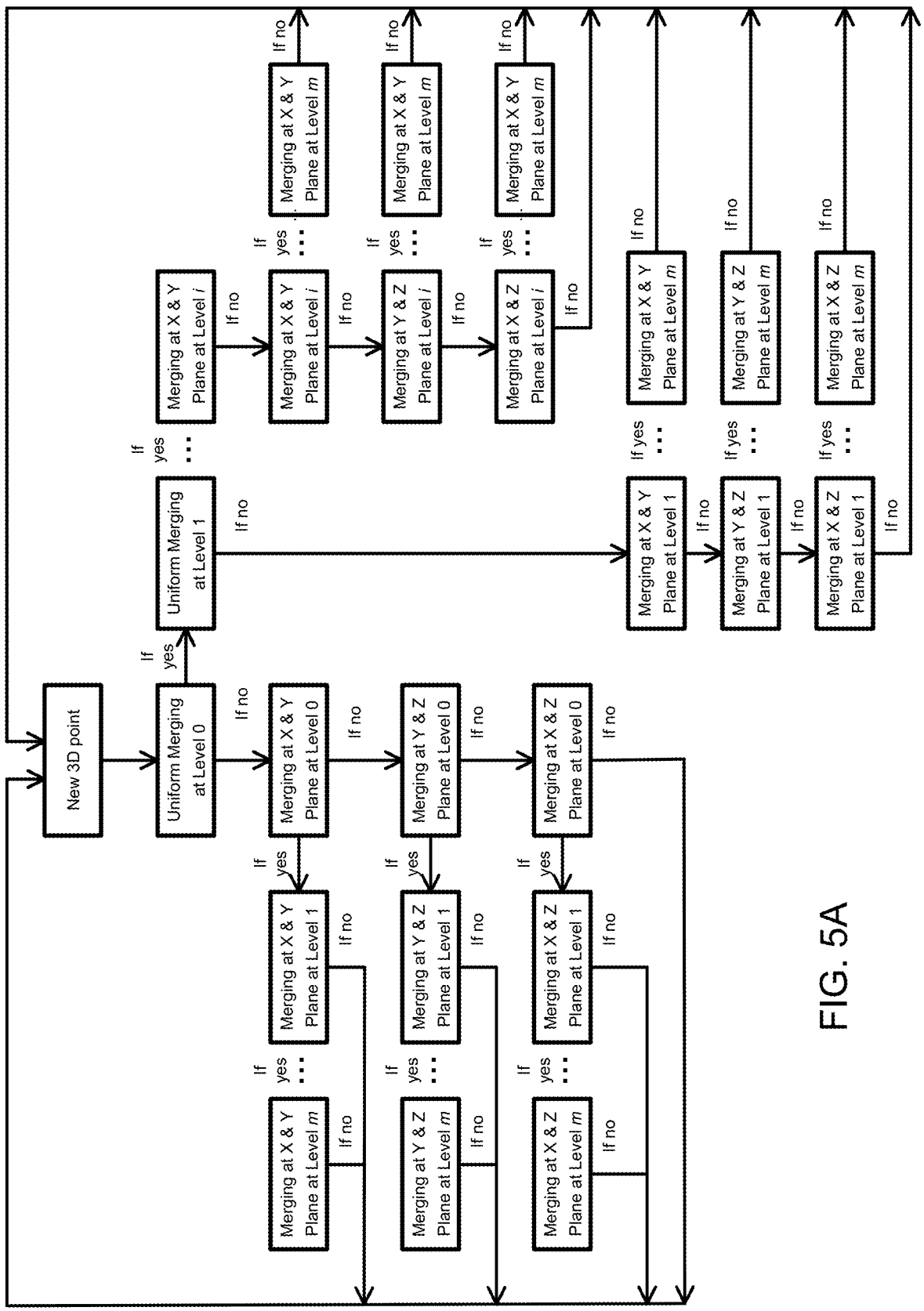
FIG. 5A depicts a flowchart of merging (with uniform merging) according to certain embodiments of the present disclosure.

FIG. 5A depicts a flowchart of merging (with uniform merging) according to certain embodiments of the present disclosure. In this flowchart, uniform merging and non-uniform merging is combined. In other embodiments, the present disclosure can include uniform merging only or non-uniform merging only. Kindly note the number m in different flowchart pathways can be different integers. Further, the Application may place a threshold to m, such that when merging at the threshold level is done, the Application stops the merging process and receives and processes another 3D point. Thus, a round of merging may stop because there is no possible merging available or because there are enough rounds of successful merging.

As shown in FIG. 5A, once a new 3D point is received, the 3D reconstruction application 110 first tries uniform merging at scale level 0. If the uniform merging works, the uniform merging continues until at a level that no more merging is available. Then the 3D reconstruction application 110 continue to try merging sequentially at x and y plane, y and z plane, and x and z plane.

If uniform merging at level 0 is not possible, the 3D reconstruction application 110 performs merging at xy-plane, until no more merging is available at xy-plane.

If the merging at xy-plane at level 0 is not possible, the 3D reconstruction application 110 performs merging at yz-plane, until no more merging is available at yz-plane.

If the merging at yz-plane at level 0 is not possible, the 3D reconstruction application 110 performs merging at xz-plane, until no more merging is available at xz-plane.

Figure 5B:
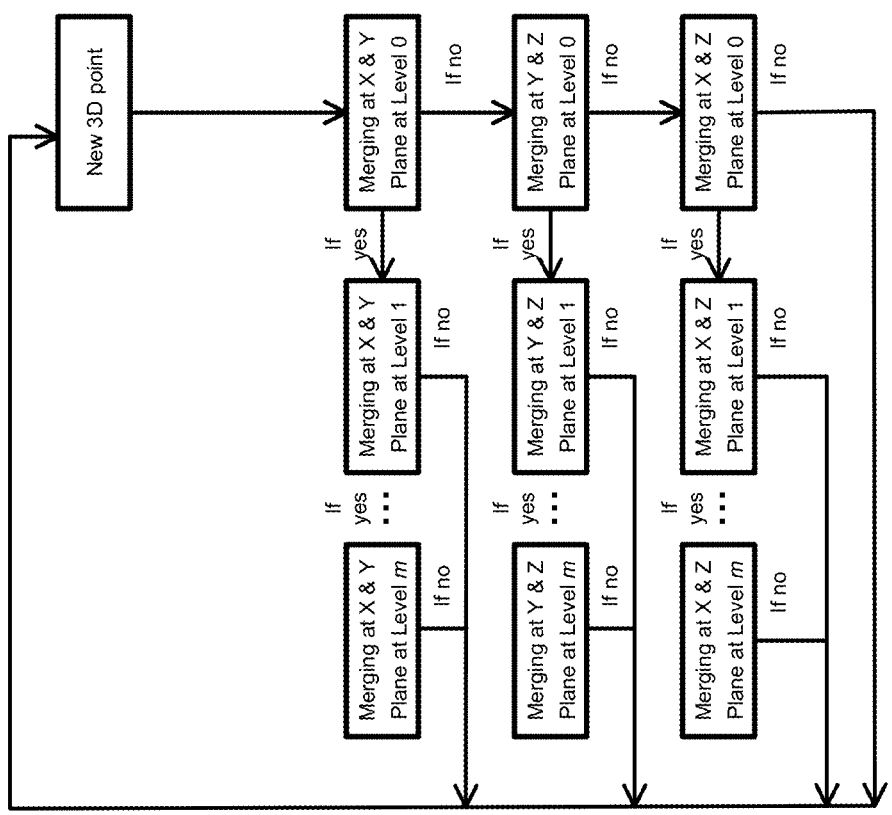
FIG. 5B depicts a flowchart of merging (without uniform merging) according to certain embodiments of the present disclosure.

Uniform merging may have disadvantages for AR application. Accordingly, as shown in FIG. 5B, the Application of the present disclosure doesn't need to include the uniform merging.

EXAMPLES OF THE DISCLOSURE

In certain examples, a 3D reconstruction application (or AR application) is implemented using ARKit and Object C, and the Application is tested on iPhone 8. The VIO algorithm of ARKit runs at 60 fps and produces dozens to hundreds of 3D points per frame depending on the complexity of the scene. The Application processes these 3D points and inserts them into multi-scale voxel hash data structure in real time.

Figure 6A:
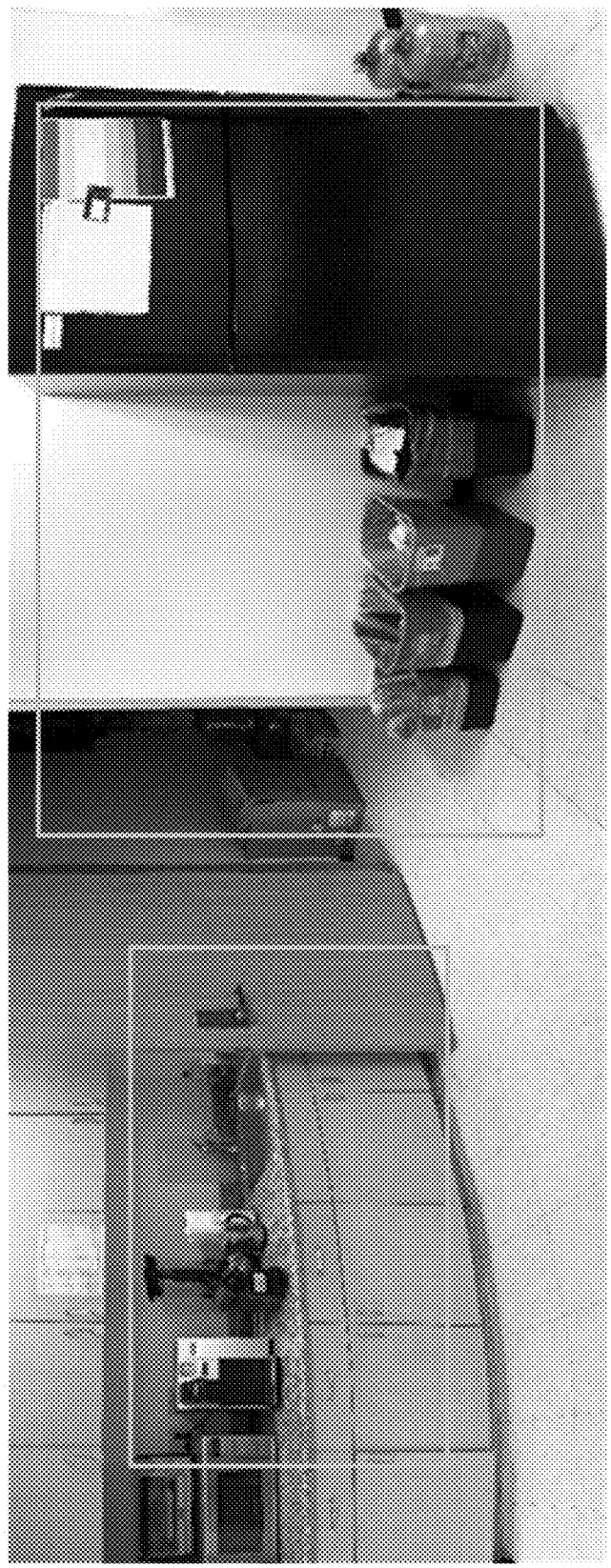
FIGS. 6A-6F schematically depict an example of the present disclosure applying on an office kitchen.
Figure 6C:
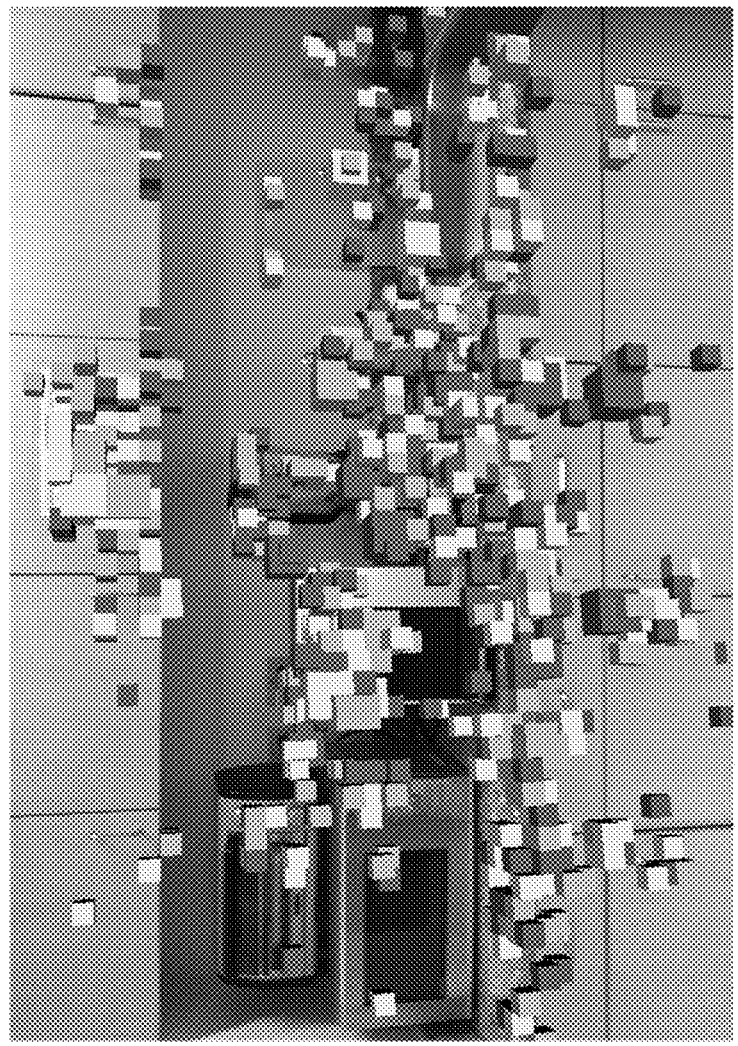
Figure 6B:
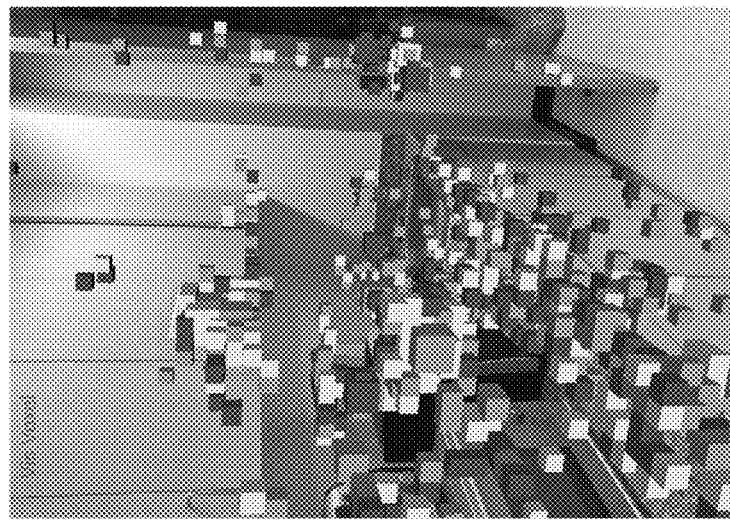
Figure 6E:
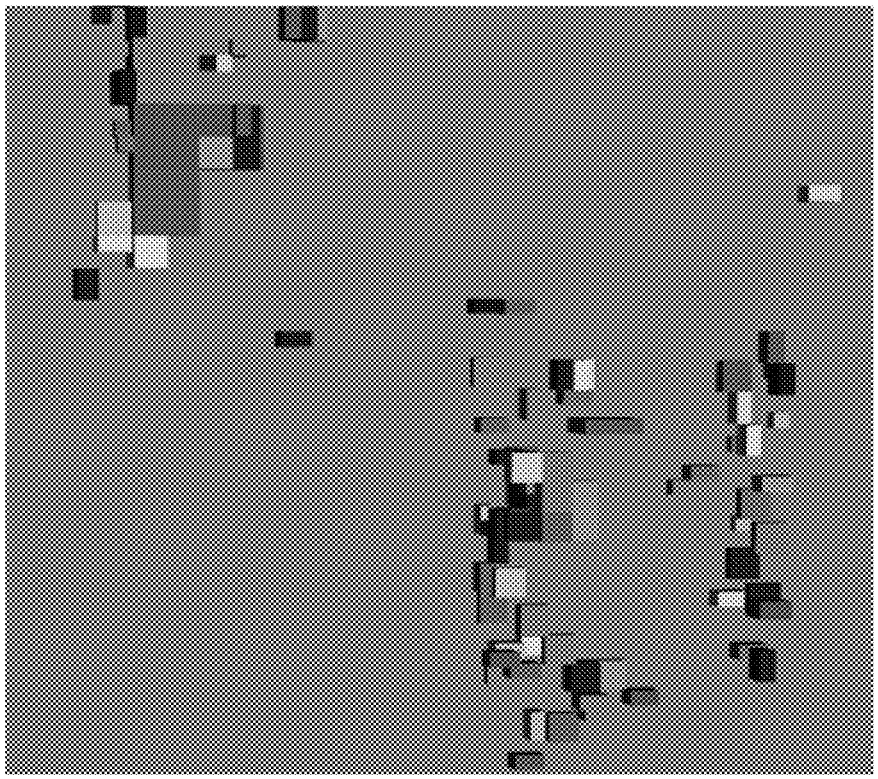
Figure 6D:
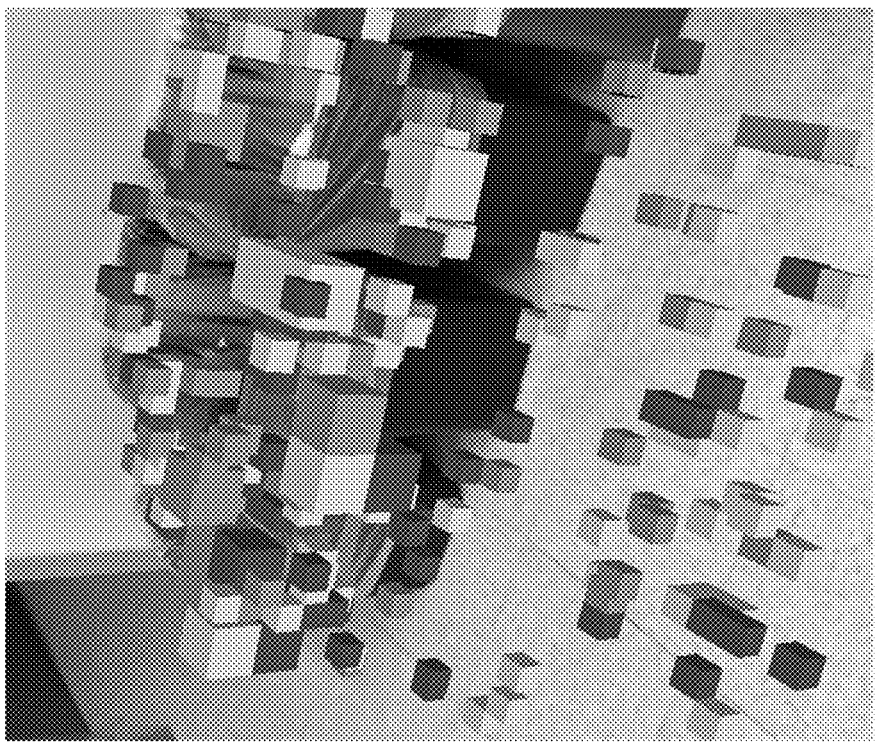
Figure 6F:
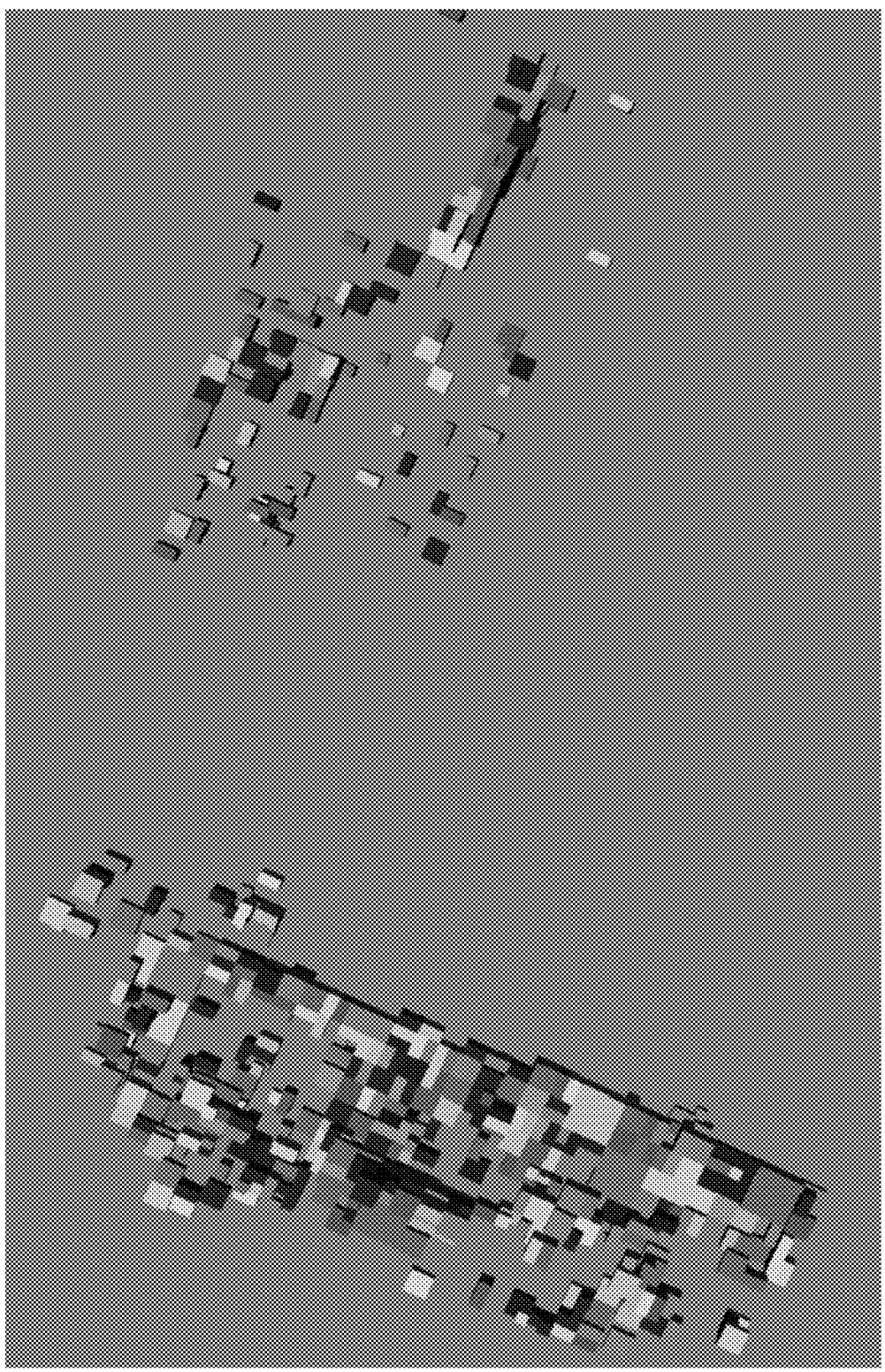
Figure 7A:
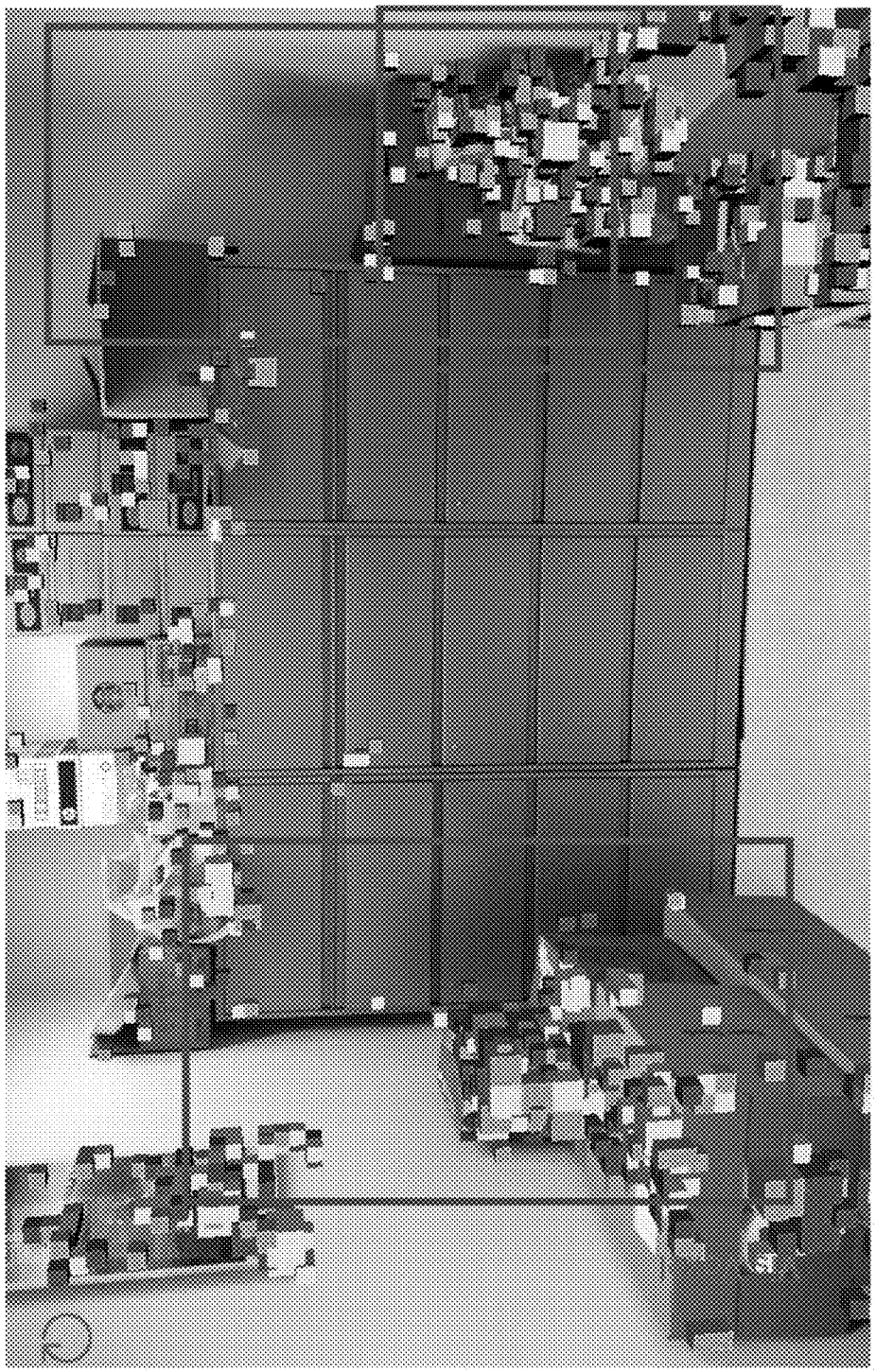
FIGS. 7A-7D schematically depict an example of the present disclosure applying on a storage room.
Figure 7C:
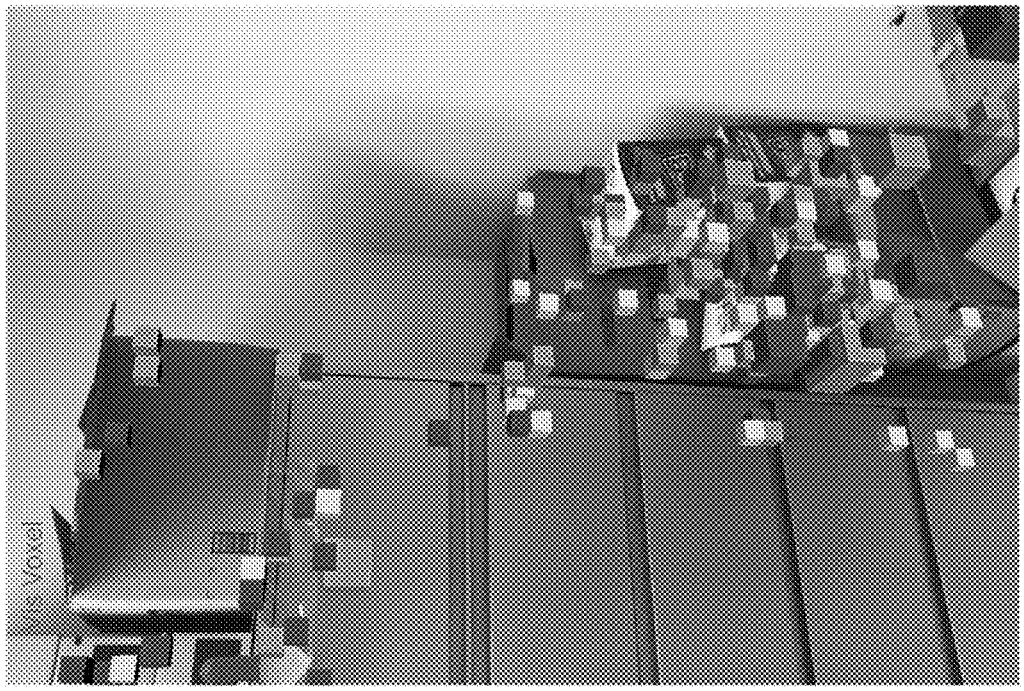
Figure 7B:
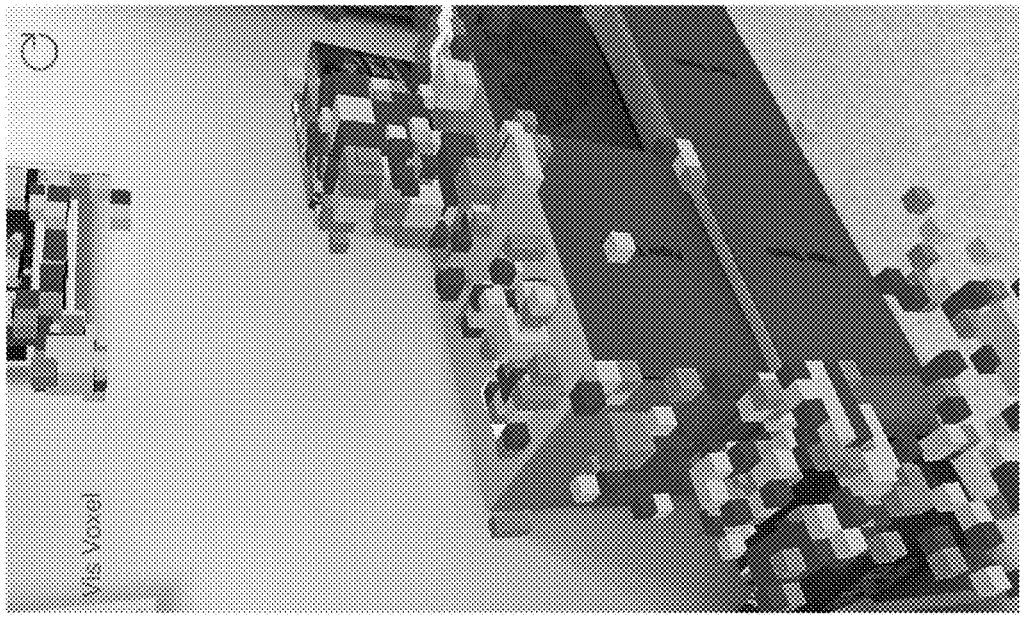
Figure 7D:
Figure 8A:
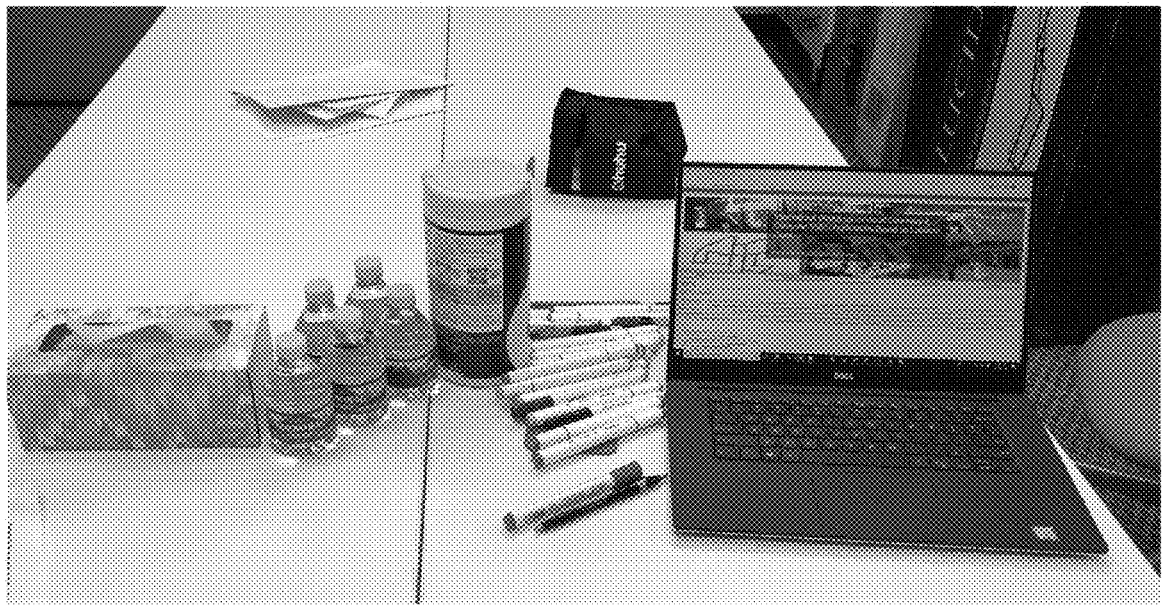
FIGS. 8A-8B schematically depict an example of the present disclosure applying on a table.
Figure 8B:
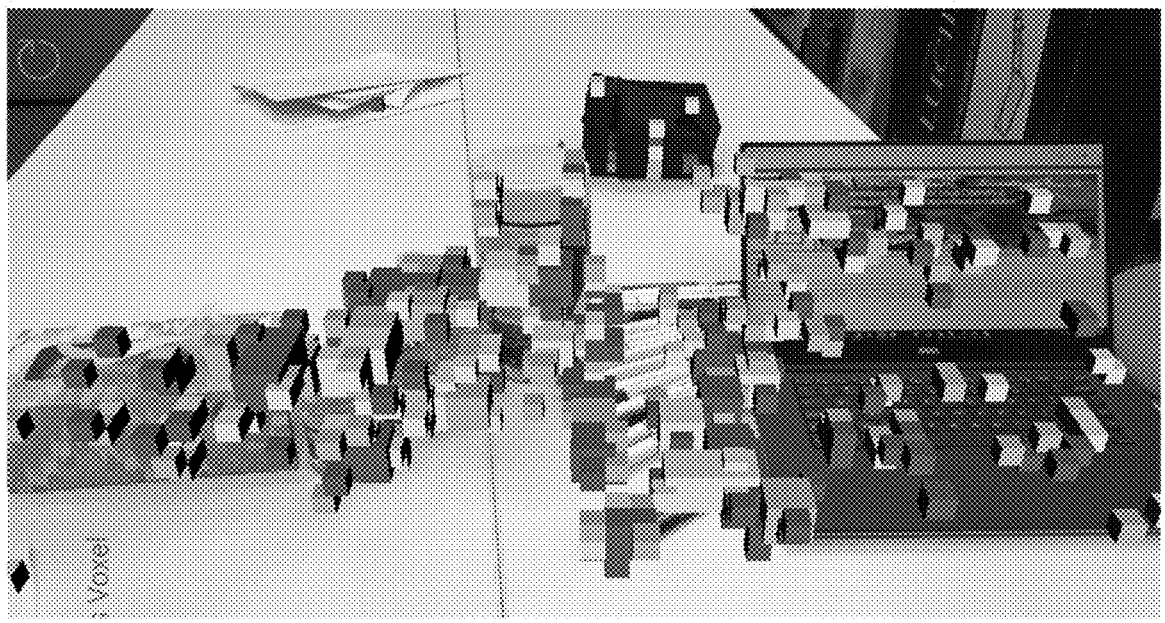

The Application is applied on four different scenes, including an office kitchen, a storage room, a table, and a conference room. FIGS. 6A-6F schematically show an example of applying the Application according to certain embodiments of the present disclosure on the office kitchen, where FIG. 6A shows a panorama of the office kitchen scene, FIG. 6B shows a side view of the sink area with voxels superimposed on the scene, FIG. 6C shows the front view of the sink area, FIG. 6D shows the close-up view of the trash bins and nearby floor, FIG. 6E shows a front view of the refrigerator area, and FIG. 6F shows a top-down view of the entire voxel representation. FIGS. 7A-7D schematically show an example of applying the Application according to certain embodiments of the present disclosure on the storage room, where FIG. 7A shows the complete view of the storage room with multi-scale voxel representation, and FIGS. 7B-7D show the close-up views of certain areas. FIGS. 8A and 8B show a picture of the table top scene before and after superimposing multi-scale voxel representation.

The above multi-scale representations are implemented at real time. Further, a sequence of point clouds and images for each scene are captured to process offline. Inter-point distance varies for different scenes. When a scene is closer to the camera, the reconstructed points are closer to each other; thus requiring smaller voxels to better approximate the geometry of the scene. The scene depth is estimated from a sequence of initial frames and the depth is used to determine the minimal voxel size $m_v$. In the system of the disclosure, the Application determines the threshold using the following formula (2):

$$m_v = \begin{cases} 2 \text{ cm:} & D < 0.75 \text{ m} \\ 4 \text{ cm:} & 0.75 \text{ m} \leq D < 1 \text{ m} \\ 8 \text{ cm:} & D \geq 1 \text{ m} \end{cases} \quad (2)$$

where D is the initial scene depth.

In each case, the Application can efficiently process the incoming 3D points generated by ARKit and convert them into multi-scale voxels in real time. FIG. 9A shows the results of using the Application to the above scenes. The table lists include capture time, number of total 3D points reconstructed by ARKit, number of voxels reconstructed by our algorithm, and unit voxel size used by the Application. Compression ratio, which is the ratio between storage required for all 3D points (float point coordinates) to the storage required for multi-scale voxel data structure, is calculated. Each voxel entry requires 3 bytes for integer coordinates $(x_i, y_i, z_i)$, 3 bytes for $l_x, l_y, l_z$ scales, and 4 bytes for density. For less complex scenes, such as Table and Conference Room, the compression ratio is much larger than more complex scenes. It is worth noting that VIO systems like ARKit do not provide inter-frame correspondence information to developers; therefore, the 3D points are largely redundant, and the total number of points is much larger than the actual features in the scene.

The Application scales well with increasing number of 3D points when the Application runs for a longer period of time. FIG. 9B shows the change of 3D points and voxels with the increasing capture time on the office kitchen scene. The running time is increased from 30 second (s) to 240 s and the total number of points generated by ARKit and number of reconstructed voxels for the office kitchen scene are recorded. The unit voxel was set to be 8 cm. When the number of points increases approximately linearly with capture time, the number of reconstructed voxels grows at a much slower rate.

To show the effectiveness of the bottom-up merging scheme according to certain embodiments of the present disclosure, the voxel hashing Application is applied with and without multi-scale processing. FIG. 9C shows the number of reconstructed voxels using single scale (first row) and multi-scale (second row). The multi-scale scheme reduces total memory footprint consistently by 30% to 40%.

Figure 10B:
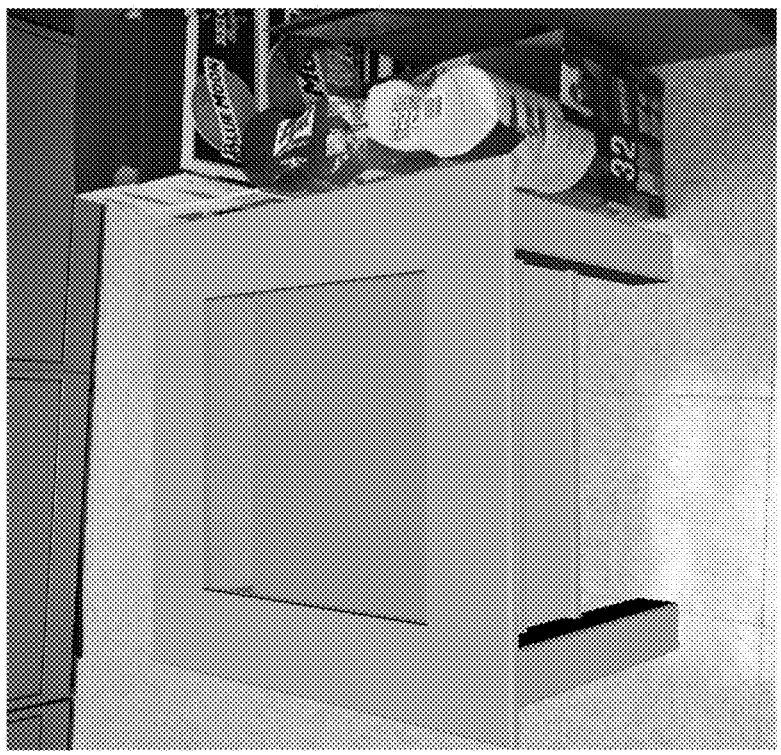
FIGS. 10A-10D schematically depict collision detection results according to certain embodiments of the disclosure.
Figure 10A:
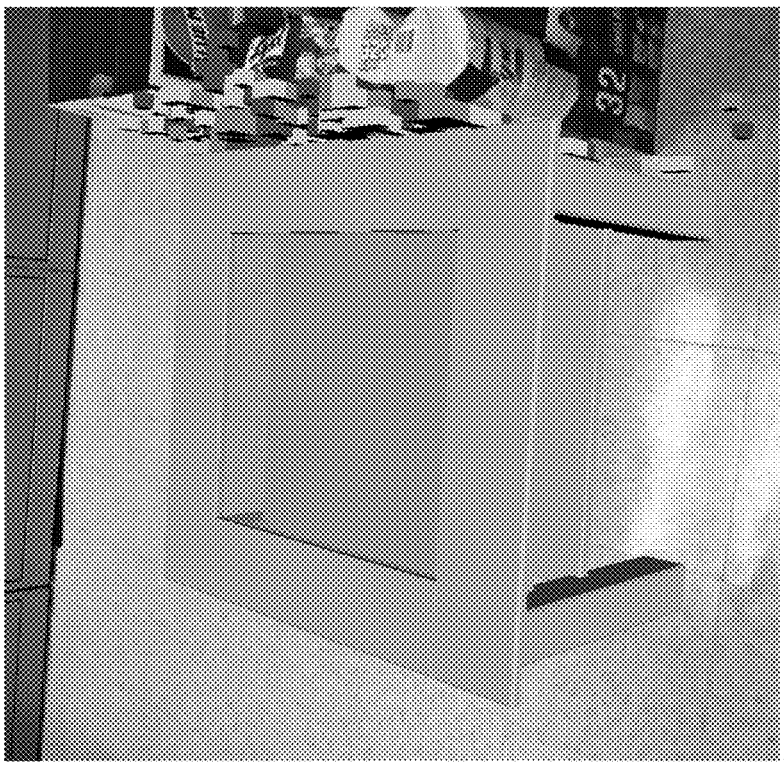
Figure 10D:
Figure 10C:
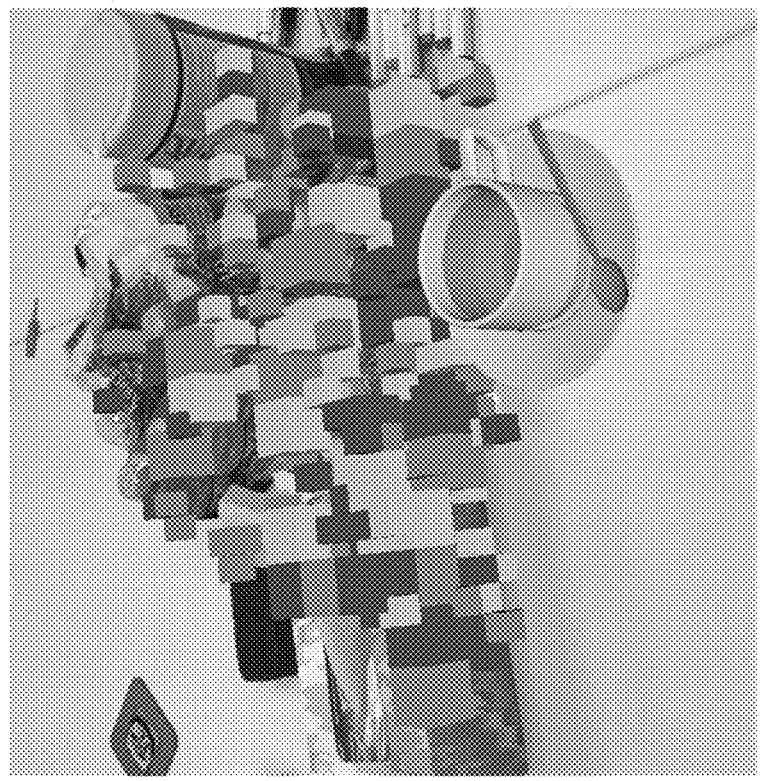

In one example, collision detection and avoidance are implemented in the AR application of the disclosure. When a user interacts with the digital object during AR view, collision is detected in real time using the overlapping bounding box approach described above and the movement of the digital object is stopped if potential collision is detected. FIGS. 10A-10D show collision detection results using the AR application. When the user "pushes" the virtual objects towards the obstacles, the mobile phone shows the rendering results where the virtual objects are being stopped. FIG. 10A shows the superimposing of the voxel representation of the image of FIG. 10B, and FIG. 10C shows the superimposing of the voxel representation of the image of FIG. 10D.

In summary, the present disclosure provides an efficient algorithm that can process 3D points generated by mobile VIO systems (e.g., ARKit and ARCore). The approach is capable of compressing the 3D points into a multi-scale voxel hash structure in real time. The data structure requires a small memory footprint and supports efficient collision detection for mobile AR applications.

In certain embodiments, the unit voxel size is set using estimated scene depth from an initial sequence of frames. In other embodiments, the present disclosure allows for dynamically adjusting the unit voxel size based on the current scene depth. In certain embodiments, the AR application may use plane detection to estimate the orientation of the room so that the axis-aligned voxels are aligned with the major vertical surfaces in the scene. In other embodiments, the AR application adds orientation to the voxels to better approximate surfaces with different orientations. In certain aspects, the present disclosure is related to a non-transitory computer readable medium storing computer executable code. The code, when executed at a processor 102 of the computing device 100, may perform the method 400 as described above. In certain embodiments, the non-transitory computer readable medium may include, but not limited to, any physical or virtual storage media. In certain embodiments, the non-transitory computer readable medium may be implemented as the storage device 106 of the computing device 100 as shown in FIG. 1.

In certain embodiments, the AR application according to the disclosure can be used in a mobile device such as a smart phone, a personal computer or tablets. In other embodiments, the AR application can also be used in a computing server, a cloud computer, a robotic device, a drone. Further, examples are provided for AR applications, however, the disclosure is not limited thereto. Rather, this disclosure provides a general method for representing 3D maps efficiently using multi-scales, and can be used in other applications relating to 3D map processing.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

REFERENCES

1. ARKit. https://developer.apple.com/arkit/
2. ARCore: https://developers.google.com/ar/
3. A Volumetric Method for Building Complex Models from Range Images, Brian Curless and Marc Levoy, Proc. SIGGRAPH '96.
4. "KinectFusion: Real-time dense surface mapping and tracking," R. A. Newcombe et al., 2011 10th IEEE International Symposium on Mixed and Augmented Reality, Basel, 2011, pp. 127-136.
5. "Real-time 3D reconstruction at scale using voxel hashing," Matthias Nießner, Michael Zollhöfer, Shahram Izadi, and Marc Stamminger. 2013. ACM Trans. Graph. 32, 6, Article 169 (November 2013).

What is claimed is:

1. A method for constructing a multi-scale voxel representation of a three-dimensional (3D) point map using a computing device, the method comprising:
    providing the 3D point map in a coordinate space, the coordinate space having x, y and z axes;
    receiving coordinates of a 3D point from the 3D point map;
    converting the coordinates of the 3D point to integer coordinates;
    comparing the integer coordinates with voxel entries in a hash table; and
    in determining the integer coordinates are not encompassed by any of the voxel entries in the hash table:
        creating a new unit voxel, each of three dimensions of the new unit voxel having a unit length respectively corresponding to one integer unit of the integer coordinates along the axes of the coordinate space;
        calculating a hash value using the integer coordinates;
        inserting the new unit voxel into the hash table; and
        merging the new unit voxel with neighboring voxels along at least one axis of the coordinate space, so as to obtain the multi-scale voxel representation of the 3D point map.

2. The method of claim 1, wherein the step of merging comprises:
    determining three neighboring level m voxels, wherein the three neighboring level m voxels are located at a same plane as a new level m voxel, the three neighboring level m voxels and the new level m voxel belong to a same uniform level m+1 voxel, a longest dimension of each of the level m voxel and the new level m voxel has a length of $2^m$ units, and all three dimensions of the uniform level m+1 voxel has a length of $2^{m+1}$ units; and when the three neighboring level m voxels are available in the hash table:
        combining the new level m voxel and the three neighboring level m voxels to form a new level m+1 voxel, a longest dimension of the new level m+1 voxel having a length of $2^{m+1}$ units;
        adding the new level m+1 voxel to the hash table; and
        deleting the three neighboring level m voxels and the new level m voxel from the hash table,
    wherein m is an integer in a range of 0-9, and a density of the new level m+1 voxel is a sum of densities of the new level m voxel and the three neighboring level m voxels.

3. The method of claim 2, wherein integer coordinates of the 3D point are $(x_i, y_i, z_i)$, integer coordinates of a vertex of the uniform level m+1 voxel that is closest to origin of the coordinate space are $(x_i/2^{(m+1)}*2^{(m+1)}, y_i/2^{(m+1)}*2^{(m+1)}, z_i/2^{(m+1)}*2^{(m+1)})$, and each of the $x_i/2^{(m+1)}$, $y_i/2^{(m+1)}$, $z_i/2^{(m+1)}$ is an integer division.

4. The method of claim 3, wherein the step of merging is attempted sequentially along xy-plane defined by the x and y axes, yz-plane defined by the y and z axes, and xz-plane defined by the x and z axes.

5. The method of claim 1, wherein the 3D point map is a 3D sparse point map.

6. The method of claim 1, wherein the coordinates of the 3D point are converted to the integer coordinates by multiplying the coordinates with a scaling integer.

7. The method of claim 1, wherein integer coordinates of the 3D point are $(x_i, y_i, z_i)$, and the step of comparing the integer coordinates with voxel entries in a hash table comprises:
    calculating a hash value using $(x_i/2^h*2^h, y_i/2^k*2^k, z_i/2^l*2^l)$; and
    comparing the integer coordinates $(x_i, y_i, z_i)$ with coordinates of level (h, k, l) voxel entries indexed by the hash value to determine whether the integer coordinates $(x_i, y_i, z_i)$ are encompassed by any one of the level (h, k, l) voxel entries indexed by the hash value,
    wherein h, k, l are respectively scale levels along the x, y, z axes.

8. The method of claim 1, wherein the hash value is calculated using a formula of:

$$H(x_i,y_i,z_i)=(x_i*p_1 \oplus y_i*p_2 \oplus z_i*p_3) \bmod n,$$

wherein $(x_i, y_i, z_i)$ are integer coordinates of the 3D point, $p_1$, $p_2$, and $p_3$ are large prime numbers, $\oplus$ is exclusive or operation, and n is a number of slots in the hash table.

9. The method of claim 1, wherein each of the voxel entries in the hash table is in a form of $\{x_i, y_i, z_i, l_x, l_z, d\}$, where $x_i, y_i, z_i$ are integer coordinates of the representative vertex of the voxel, $l_x$, $l_y$, and $l_z$ are scale levels along the x, y and z direction, and d is density of corresponding voxel entry.

10. The method of claim 1, further comprising aligning the 3D point map with real world coordinates of a scene.

11. The method of claim 1, further comprising detecting and avoiding collision of a 3D model and the 3D point map by:
    converting the 3D model to a 3D representation, the 3D representation comprising voxel representation, bounding box representation and bounding sphere representation; and
    determining whether the 3D representation of the 3D model overlaps with the multi-scale voxel representation of the 3D point map.

12. The method of claim 1, wherein when the integer coordinates are encompassed by the voxel entry of the hash table: adding density of the one voxel entry by 1.

13. A system for constructing a multi-scale voxel representation of a three-dimensional (3D) point map, the system comprising a computing device, the computing device comprising a processor and a storage device storing computer executable code, wherein the computer executable code, when executed at the processor, is configured to:
provide the 3D point map in a coordinate space, the coordinate space having x, y and z axes;
receive coordinates of a 3D point from the 3D point map;
convert the coordinates of the 3D point to integer coordinates;
compare the integer coordinates with voxel entries in a hash table; and
in determining the integer coordinates are not encompassed by any of the voxel entries in the hash table:
create a new unit voxel, each of three dimensions of the new unit voxel having a unit length respectively corresponding to one integer unit of the integer coordinates along the axes of the coordinate space;
calculate a hash value using the integer coordinates;
insert the new unit voxel into the hash table; and
merge the new unit voxel with neighboring voxels along at least one axis of the coordinate space, so as to obtain the multi-scale voxel representation of the 3D point map.

14. The system of claim 13, wherein the computer executable code is configured to merge the new voxel by:
determining three neighboring level m voxels, wherein the three neighboring level m voxels are located at a same plane as a new level m voxel, the three neighboring level m voxels and the new level m voxel belong to a same uniform level m+1 voxel, a longest dimension of each of the level m voxel and the new level m voxel has a length of $2^m$ units, and all three dimensions of the uniform level m+1 voxel has a length of $2^{m+1}$ units; and
when the three neighboring level m voxels are available in the hash table:
combining the new level m voxel and the three neighboring level m voxels to form a new level m+1 voxel, a longest dimension of the new level m+1 voxel has a length of $2^{m+1}$ units;
adding the new level m+1 voxel to the hash table; and
deleting the three neighboring level m voxels and the new level m voxel from the hash table,
wherein m is an integer in a range of 0-9, and a density of the new level m+1 voxel is a sum of densities of the new level m voxel and the three neighboring level m voxels.

15. The system of claim 13, wherein the computer executable code is configured to attempt merging sequentially on xy-plane defined by the x and y axes, yz-plane defined by they and z axes, and xz-plane defined by the x and z axes.

16. The system of claim 13, wherein the 3D point map is a 3D sparse point map, the computer executable code is configured to convert the coordinates of the 3D point to the integer coordinates by multiplying the coordinates with a scaling integer.

17. The system of claim 13, wherein the computer executable code is configured to calculate the hash value using a formula of:

$H(x_i, y_i, z_i) = (x_i * p_1 \oplus y_i * p_2 \oplus z_i * p_3) \mod n$, wherein $(x_i, y_i, z_i)$ are integer coordinates of the 3D point, $p_1$, $p_2$, and $p_3$ are large prime numbers, $\oplus$ is exclusive or operation, and n is a number of slots in the hash table.

18. The system of claim 13, wherein each of the voxel entries in the hash table is in a form of $\{x_i, y_i, z_i, l_x, l_y, l_z, d\}$, where $x_i$, $y_i$, $z_i$ are integer coordinates of the representative vertex of the voxel, $l_x$, $l_y$, and $l_z$ are scale levels along the x, y and z axis, and d is density of corresponding voxel entry.

19. The system of claim 13, wherein the computer executable code is further configured to detect and avoid collision of a 3D model and the 3D point map by:
converting the 3D model to a 3D representation, the 3D representation comprising voxel representation, bounding box representation and bounding sphere representation; and
determining whether the 3D representation of the 3D model overlaps with the multi-scale voxel representation of the 3D point map.

20. A non-transitory computer readable medium storing computer executable code, wherein the computer executable code, when executed at a processor of a computing device, is configured to:
provide the 3D point map in a coordinate space, the coordinate space having x, y and z axes;
receive coordinates of a 3D point from the 3D point map;
convert the coordinates of the 3D point to integer coordinates;
compare the integer coordinates with voxel entries in a hash table; and
in determining the integer coordinates are not encompassed by any of the voxel entries in the hash table:
create a new unit voxel, each of three dimensions of the new unit voxel having a unit length respectively corresponding to one integer unit of the integer coordinates along the axes of the coordinate space;
calculate a hash value using the integer coordinates;
insert the new unit voxel into the hash table; and
merge the new unit voxel with neighboring voxels along at least one axis of the coordinate space, so as to obtain the multi-scale voxel representation of the 3D point map.

* * * * *